United States Patent
Fujiki

(10) Patent No.: US 7,911,912 B2
(45) Date of Patent: Mar. 22, 2011

(54) OPTICAL DISC RECORDING APPARATUS AND METHODS USING PSEUDO-RANDOM NUMBER SEQUENCE FOR RECORDING AUXILIARY INFORMATION

(75) Inventor: Toshihiro Fujiki, Tokyo (JP)

(73) Assignee: Sony Corporation, Tokyo (JP)

( * ) Notice: Subject to any disclaimer, the term of this patent is extended or adjusted under 35 U.S.C. 154(b) by 964 days.

(21) Appl. No.: 10/550,289

(22) PCT Filed: Jan. 21, 2005

(86) PCT No.: PCT/JP2005/001160
§ 371 (c)(1),
(2), (4) Date: Sep. 22, 2005

(87) PCT Pub. No.: WO2005/073969
PCT Pub. Date: Aug. 11, 2005

(65) Prior Publication Data
US 2006/0187793 A1 Aug. 24, 2006

(30) Foreign Application Priority Data

Jan. 29, 2004 (JP) ................................. 2004-021658

(51) Int. Cl.
*G11B 7/00* (2006.01)
(52) U.S. Cl. ...................... 369/59.25; 369/84; 369/53.21
(58) Field of Classification Search .............. 369/59.25, 369/84, 53.21
See application file for complete search history.

(56) References Cited

U.S. PATENT DOCUMENTS

| 6,025,946 | A | * | 2/2000 | Miyamori et al. | ............ 398/185 |
| 6,219,322 | B1 | * | 4/2001 | Kobayashi | ................. 369/59.11 |
| 6,331,969 | B1 | * | 12/2001 | Kobayashi et al. | ........ 369/275.3 |
| 6,480,072 | B1 | * | 11/2002 | Walsh et al. | ..................... 331/78 |
| 2006/0072396 | A1 | * | 4/2006 | Richter et al. | ............... 369/47.1 |

FOREIGN PATENT DOCUMENTS

| EP | 1 059 632 A1 | 12/2000 |
| EP | 1 069 563 A2 | 1/2001 |
| JP | 5-325193 | 12/1993 |
| JP | 7-161139 | 6/1995 |
| JP | 10-149621 | 6/1998 |
| JP | 11-126426 | 5/1999 |
| JP | 11-185258 | 7/1999 |
| JP | 11-191218 | 7/1999 |
| JP | 11191218 A * | 7/1999 |
| JP | 2004-5936 | 1/2004 |

OTHER PUBLICATIONS

Supplemental European Search Report issued Nov. 25, 2010, in European Patent Application No. 05704213.7-2223.

* cited by examiner

*Primary Examiner* — Wayne R Young
*Assistant Examiner* — LaTanya Bibbins
(74) *Attorney, Agent, or Firm* — Oblon, Spivak, McClelland, Maier & Neustadt, L.L.P.

(57) ABSTRACT

An optical disc recording apparatus that uses a pseudo-random number sequence for recording auxiliary information, wherein a sequence of data based on auxiliary information is modulated by a signal represented by a combination of a sequence of pseudo-random numbers and a predetermined periodic signal, and recorded traces of the pits or the marks are changed depending on the modulated sequence of data, thereby recording the auxiliary information on the optical disc. By making it difficult to estimate the structure of the sequence of pseudo-random numbers, duplication of an optical disc is hindered.

11 Claims, 15 Drawing Sheets

FIG.10
(A) 
(B) 
(C) 
(D) 

OPTICAL DISC RECORDING APPARATUS AND METHODS USING PSEUDO-RANDOM NUMBER SEQUENCE FOR RECORDING AUXILIARY INFORMATION

TECHNICAL FIELD

The present invention relates to an apparatus for producing an optical disc such as a CD (Compact Disc), for example.

BACKGROUND ART

Compact discs have main information such as music information which is recorded in the form of a sequence of pits having lengths in the range from 3T to 11T where T represents the basic period of a data sequence of the main information, by converting the main information into a digital signal, processing the signal according to an error correcting encoding process, modulating the signal according to an EFM (Eight to Fourteen Modulation) process, and controlling a light beam with the EFM-modulated signal to burn the pits.

Compact discs have a lead-in area in their inner circumferential region for recording managerial data called TOC (Table of Contents). Based on the TOC data, the user can select and play desired ones of music pieces that are recorded on a compact disc.

Compact discs also have a code engraved inwardly of the lead-in area as representing the manufacturer, the manufacturing factory, the disc number, etc. for the user to visually confirm the record of a compact disc.

Since the user can visually confirm the record of a compact disc from an engraved code on the compact disc, the user can identify the compact disc as an illegal copy based on whether the compact disc carries an engraved code or not. However, as the engraved code is primarily intended to give the user a visual confirmation, it is difficult for the optical pickups of some compact disc players to reproduce the engraved code. For identification of an illegal copy based on an engraved code, therefore, it is necessary to use a dedicated reproducing mechanism for reproducing engraved codes.

If auxiliary information that can be reproduced by an optical pickup for reproducing audio data can be recorded on compact discs without affecting the reproduction of audio data from a sequence of pits on the compact discs, then illegal copies can be rejected using the auxiliary information without the need for a dedicated reproducing function to reproduce engraved codes.

The applicant has previously presented an apparatus for recording auxiliary information on a compact disc by changing the width of a portion of pits or marks having a predetermined length or more, of all pits or marks formed on an optical disc, based on the data sequence of the auxiliary information, as disclosed in Japanese Patent No. 3,292,295.

The disclosed apparatus according to Japanese Patent No. 3,292,295 records, as auxiliary information, identification data for identifying the optical disc or key information for decrypting encrypted main information recorded on the optical disc. The disclosed apparatus employs a pseudo-random number sequence, typified by M-sequence random numbers, to record auxiliary information for preventing the recorded auxiliary information from being easily read for illegal copies.

DISCLOSURE OF INVENTION

However, because a pseudo-random number sequence such as M-sequence random numbers is usually generated using a linear feedback shift resister (LFSR), the structure of the pseudo-random number sequence can easily be estimated by observing several tens of output signals of the linear feedback shift resister or several tens of repeated output signal periods.

Consequently, unauthorized persons may analyze such a pseudo-random number sequence and easily produce an optical disc with auxiliary information recorded thereon, with the analyzed results.

The invention has been made in view of the above problems, and an object of the present invention is to provide an optical disc recording apparatus which makes it difficult for anyone who attempts to make an illegal copy of the optical disc to produce an illegally copied optical disc, even if a pseudo-random number sequence is used for recording auxiliary information, by making it difficult to estimate the structure of the sequence of pseudo-random numbers. The invention also provides an optical disc manufactured by the apparatus and an optical disc reproducing apparatus for reproducing the optical disc.

According to the present invention, there is provided an optical disc recording apparatus for generating a modulation signal having a signal level switched at a period which is an integral multiple of a basic period based on main information and controlling an optical beam applied to an optical disc based on the modulation signal to successively form, on the optical disc, pits and lands or marks and spaces having lengths which are represented by integral multiples of a basic length corresponding to the basic period. A sequence of data based on auxiliary information is modulated by a signal represented by a combination of a sequence of pseudo-random numbers and a predetermined periodic signal, and recorded traces of the pits or the marks are changed depending on the modulated sequence of data, thereby recording the auxiliary information on the optical disc.

With the above arrangement, the sequence of data based on auxiliary information is modulated by the signal represented by the combination of the sequence of pseudo-random numbers and the predetermined periodic signal, and the recorded traces of the pits or the marks are changed depending on the modulated sequence of data, thereby recording the auxiliary information on the optical disc.

The above and other objects, features, and advantages of the present invention will become apparent from the following description when taken in conjunction with the accompanying drawings which illustrate preferred embodiments of the present invention by way of example.

BRIEF DESCRIPTION OF DRAWINGS

FIG. 10 is a plan view showing pit shapes of an optical disc according to another embodiment of the present invention;

BEST MODE FOR CARRYING OUT THE INVENTION

First Embodiment

<Arrangement of Optical Disc Recording Apparatus>

Figure 1:
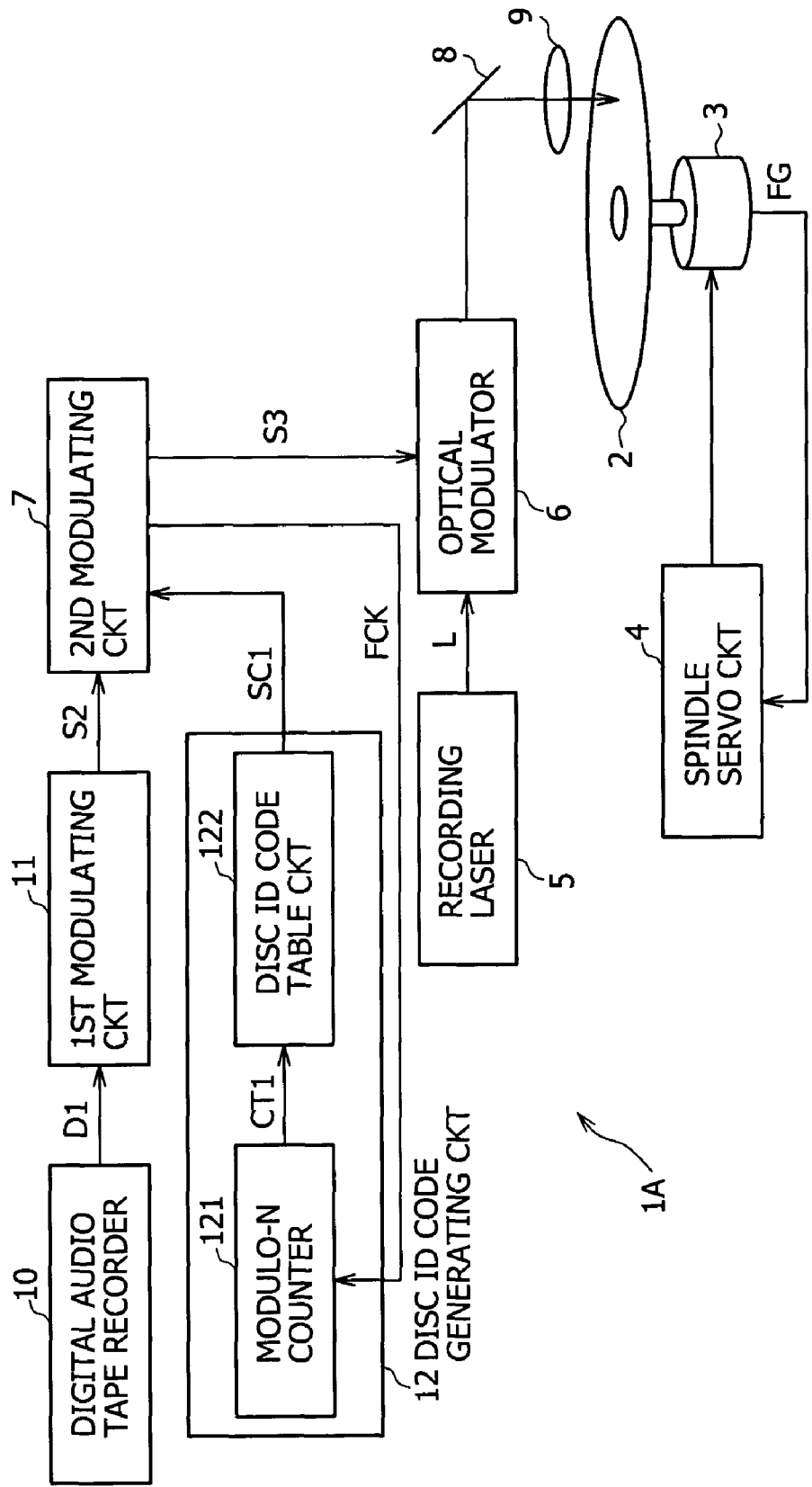
FIG. 1 is a block diagram of an optical disc recording apparatus according to a first embodiment of the present invention.

FIG. 1 shows in block form an optical disc recording apparatus according to a first embodiment of the present invention. The optical disc recording apparatus shown in FIG. 1 is an optical disc recording apparatus 1A for use in manufacturing compact discs. The optical disc recording apparatus records on a compact disc a digital audio signal as main information and a disc identification (ID) code as auxiliary information.

Compact discs as an optical disc according to the present invention are manufactured in the same manner as with conventional compact discs, except that they are produced from a disc master 2 manufactured by the optical disc recording apparatus 1A shown in FIG. 1.

Specifically, a stamper is produced from the disc master 2 manufactured by the optical disc recording apparatus 1A, and a reflecting film, a protective film, etc. are successively formed on a disc-shaped base which is produced using the stamper, thereby producing a compact disc. The stamper is produced from the disc master 2 manufactured by the optical disc recording apparatus 1A as follows: The disc master 2 manufactured by the optical disc recording apparatus 1A is developed and then electroformed into a mother disc. The stamper is then produced using the mother disc.

The disc master 2 comprises a flat glass base coated with a photosensitizer, for example. The disc master 2 is rotated about its own axis by a spindle motor 3 which is controlled for its rotation by a spindle servo circuit 4.

The spindle motor 3 has its rotational shaft coaxially coupled to a frequency signal generator (frequency generator), not shown, which supplies a frequency signal FG having a frequency depending on the rotational speed of the spindle motor 3 to the spindle servo circuit 4. The spindle servo circuit 4 controls the spindle motor 3 such that the frequency of the frequency signal FG is equalized to a predetermined frequency, for thereby controlling the disc master 2 to rotate at a constant linear velocity.

A recording laser 5 comprises a gas laser or the like for emitting a laser beam L having a predetermined amount of light. An optical modulator 6, which comprises an electric acousto-optical device or the like, modulates, i.e., turns on and off, the laser beam L emitted from the recording laser 5 according to a modulation signal S3 that is supplied from a second modulating circuit 7 to be described later.

The laser beam L modulated by the optical modulator 6 is applied to a mirror 8, which reflects the laser beam L to pass through an objective lens 9 to the surface of the disc master 2.

The objective lens 9 focuses the reflected laser beam L onto the recording surface of the disc master 2. The mirror 8 and the objective lens 9 are supported on a sled mechanism for movement in the radial direction of the disc master 2 in synchronism with the rotation of the disc master 2. Therefore, the focused spot of the laser beam L on the disc master 2 can be progressively moved radially outwardly, for example, on the disc master 2 to scan the recording surface of the disc master 2 in a spiral pattern to form a spiral track thereon which comprises a sequence of pits depending on the modulation signal S3.

A digital audio tape recorder 10 outputs a digital audio signal D1 comprising a chronological sequence of data to be recorded on the disc master 2. The digital audio signal D1 output from the digital audio tape recorder 10 is supplied to a first modulating circuit 11.

The first modulating circuit 11 performs a predetermined data processing operation for compact discs on the digital audio signal D1 and subcode data supplied from a subcode generator (not shown), generating an EFM (Eight-to-Fourteen Modulation) signal S2. Specifically, the first modulating circuit 11 performs an error-correcting encoding process on the digital audio signal D1 and the subcode data with a CIRC (Cross Interleave Reed-Solomon Code) and then modulates the digital audio signal D1 and the subcode data according to an EFM process, thereby generating the EFM signal S2.

With conventional optical disc recording apparatus, the EFM signal S2 thus generated is directly supplied to the optical modulator 6, which turns on and off, i.e., modulates, the laser beam L with the EFM signal S2, and applies the modulated laser beam L to the disc master 2.

With the optical disc recording apparatus 1A according to the present embodiment, during a period corresponding to the lead-in area of the disc master 2, a disc identification (ID) code generating circuit 12 generates a disc ID code SC1 as auxiliary information, and the second modulating circuit 7 modulates the EFM signal S2 from the first modulating circuit 11 with the disc ID code SC1 to produce a modulated signal S3, and supplies the modulated signal S3 to the optical modulator 6.

The disc ID code SC1 comprises ID information inherent in the disc master 2, information as to the manufacturing factory, information as to the production date, information for controlling whether the disc can be copied or not, etc. The disc ID code generating circuit 12 also successively outputs a synchronizing signal representative of the beginning of the disc ID code SC1 and an error-correcting code for the disc ID code SC1 in addition to the disc ID code SC1.

The disc ID code generating circuit 12 comprises a modulo-N counter 121 and a disc ID code table circuit 122. The modulo-N counter 121 comprises a ring counter for counting frame clock pulses FCK with respect to the EFM signal S2 which are output from the second modulating circuit 7, and outputs a count value CT1.

Figure 2:
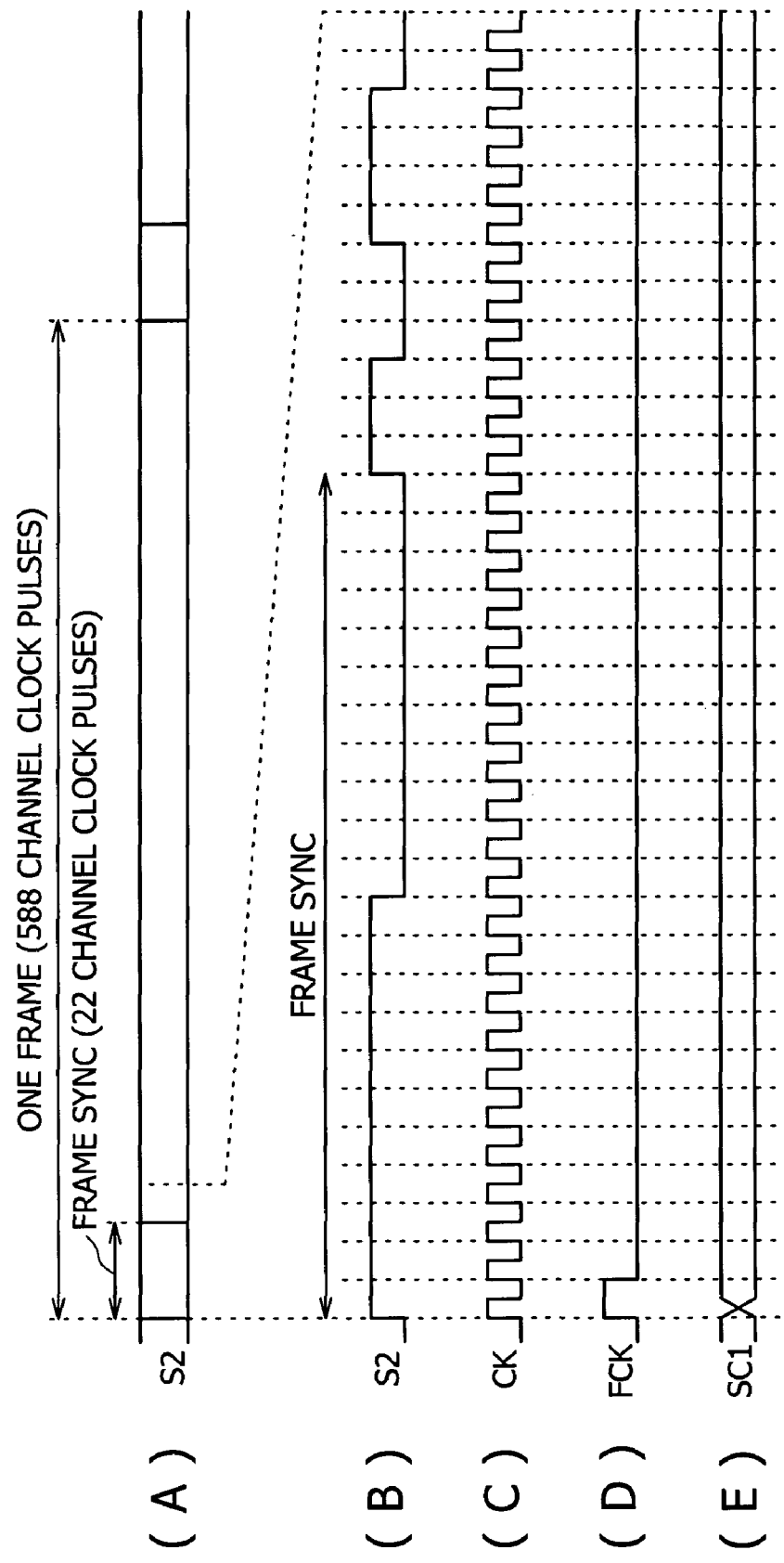
FIG. 2 is a timing chart illustrative of operation of the optical disc recording apparatus shown in FIG. 1.

As shown in FIG. 2(A) through 2E, the EFM signal S2 (see FIGS. 2(A) and 2(B)) has frames each comprising 588 channel clock pulses CK (see FIG. 2(C)) and a frame sync signal (see FIGS. 2(A) and 2(B)), inserted by the first modulating circuit 11, having a period corresponding to 22 channel clock pulses CK.

A frame clock pulse FCK (see FIG. 2(D)) is generated in timed relation to the beginning of the frame sync signal and has a high signal level in the period of one channel clock pulse. The modulo-N counter 121 counts frame clock pulses FCK to count successive frames, and outputs the count value CT1.

The disc ID code table circuit 122 comprises a ROM (Read Only Memory), for example, for holding bit information of the disc ID code SC1. The disc ID code table circuit 121 receives the count value CT1 from the modulo-N counter 121 as an address signal for the ROM and outputs data stored by the ROM. Therefore, the disc ID code table circuit 122 outputs the disc ID code SC1 (see FIG. 2(E)) as one-bit data per frame.

The second modulating circuit 7 modulates the EFM signal S2 from the first modulating circuit 11 with the disc ID code SC1, thereby generating a modulation signal S3 as a dual modulation signal.

Figure 3:
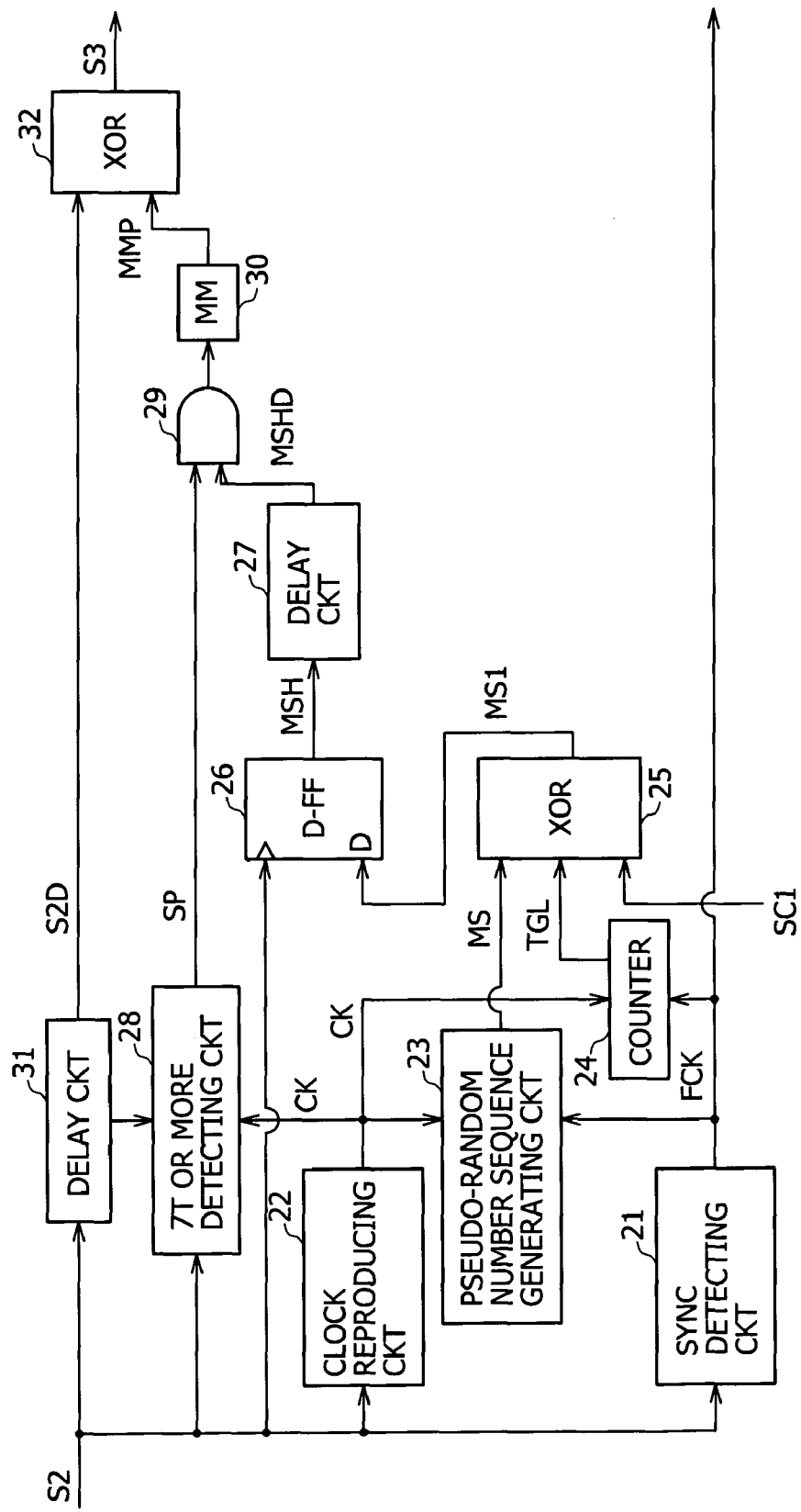
FIG. 3 is a block diagram of a second modulating circuit in the optical disc recording apparatus shown in FIG. 1.
Figure 4:
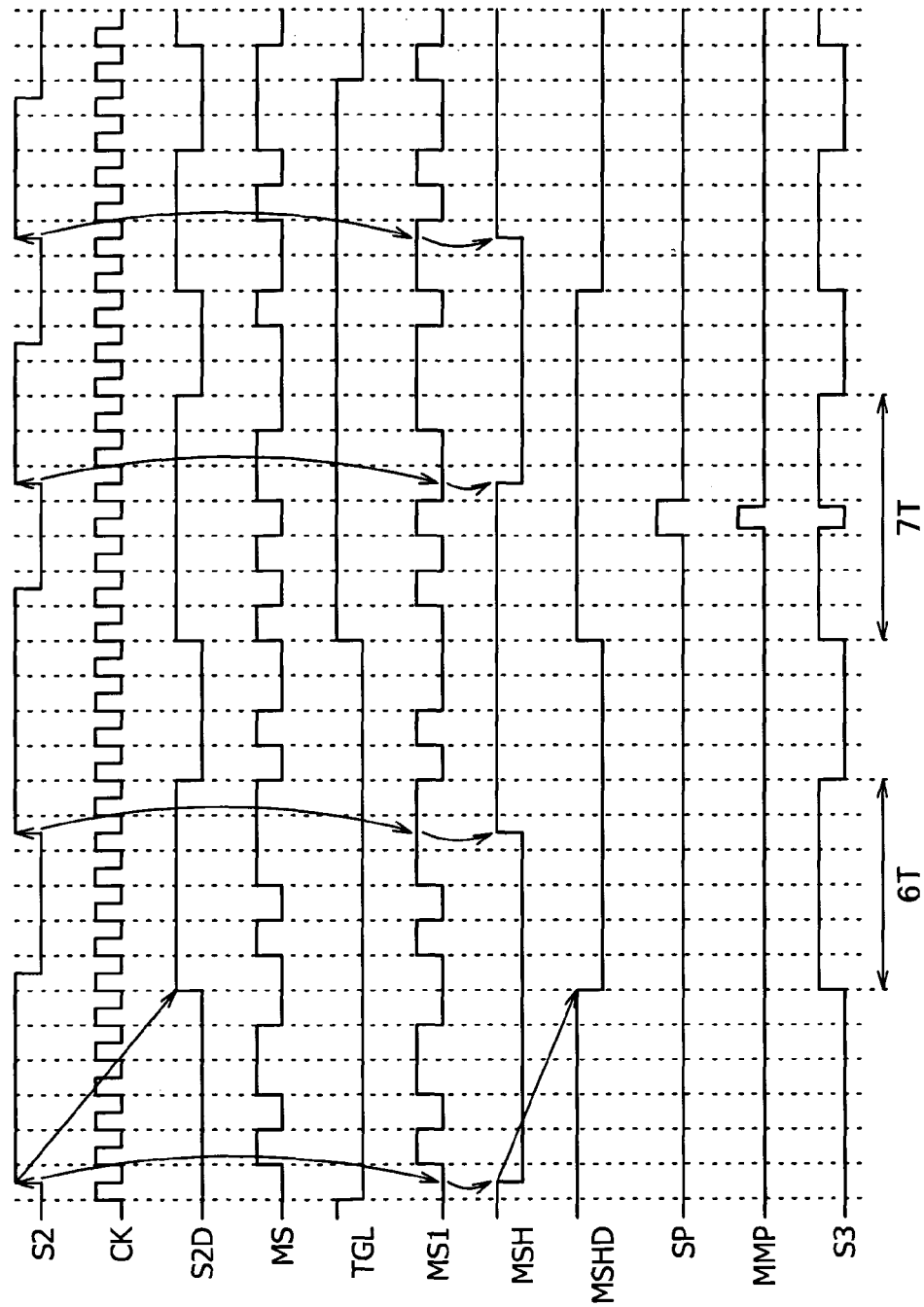
FIG. 4 is a timing chart illustrative of operation of the second modulating circuit shown in FIG. 3.

FIG. 3 shows in block form details of the second modulating circuit 7. FIG. 4 is a timing chart showing the waveforms of output signals in the second modulating circuit 7 shown in FIG. 3. The second modulating circuit 7 will be described in detail below with reference to FIGS. 3 and 4.

The second modulating circuit 7 has a synchronous detecting circuit 21 for detecting a frame sync signal from the EFM signal S2 (see FIG. 4(A)) supplied from the first modulating circuit 11, and outputs a frame clock pulse FCK.

A clock reproducing circuit 22 has a PLL circuit and reproduces channel clock pulses CK (see FIG. 4(B)) from the EFM signal S2. The block reproducing circuit 22 supplies the reproduced channel clock pulses CK to a pseudo-random number generating circuit 23, a counter 24, and a 7T or more detecting circuit 28.

In the present embodiment, the pseudo-random number generating circuit 23 comprises a linear feedback shift register (LFSR) for generating a pseudo-random number sequence as an M sequence. Specifically, the pseudo-random number generating circuit 23 comprises a plurality of cascaded flip-flops and an exclusive-OR circuit. The pseudo-random number generating circuit 23 sets an initial value in the flip-flops based on a frame clock pulse FCK, thereafter transfers the set value successively in synchronism with the channel clock pulses CK from the clock reproducing circuit 22. Further, the pseudo-random number generating circuit 23 generates an M-sequence random number data MS (see FIG. 4(D)) where a logic level 1 and a logic level 0 appear at equal probability, by feedback between given stages.

The M-sequence random number data MS represents a sequence of pseudo-random numbers indicative of a repetition of identical patterns at the period of 588 channel clock pulses (the period of one frame). The M-sequence random number data MS is supplied to an exclusive-OR circuit 25.

The counter 24 comprises a 4-bit counter in the present embodiment for counting channel clock pulses CK output from the PLL circuit 22. The counter 24 is cleared by the frame clock pulse FCK output from the synchronous detecting circuit 21. The counter 24 supplies the most significant bit of the counter value as a toggle signal TGL (see FIG. 4(E)) to the exclusive-OR circuit 25.

In response to the disc ID code SC1 from the disc ID code generating circuit 12, the M-sequence random number data MS from the pseudo-random number generating circuit 23, and the toggle signal TGL from the counter 24, the exclusive-OR circuit 25 outputs an exclusive-Ored signal MS1 (see FIG. 4(F)).

Specifically, when the toggle signal TGL is of level "0", if the disc ID code SC1 is of logic level "0", then the exclusive-OR circuit 25 outputs an exclusive-Ored signal MS1 which is represented by the logic level of the M-sequence random number data MS. Conversely, if the disc ID code SC1 is of logic level "1", then the exclusive-OR circuit 25 outputs an exclusive-ORed signal MS1 which is represented by an inversion of the logic level of the M-sequence random number data MS. The exclusive-OR circuit 25 therefore modulates the disc ID code SC1 with the M-sequence random number data MS and the toggle signal TGL. The exclusive-ORed signal MS1 from the exclusive-OR circuit 25 is supplied to the D terminal of a D flip-flop 26.

The D flip-flop 26 has a clock terminal supplied with the EFM signal S2 (see FIG. 4(A)). Therefore, the D flip-flop 26 produces a latched output signal MSH (see FIG. 4(G)) which represents the levels of the exclusive-ORed signal MS1 that are latched at respective positive-going edges of the EFM signal S2.

In the present embodiment, the modulation signal S3 output from the second modulating circuit 7 has positive-going edges corresponding to the respective positive-going edges of the EFM signal S2. Pits are formed on the disc master 2 during the periods in which the modulation signal S3 has a high level. The D flip-flop 26 samples the logic level of the exclusive-ORed signal MS1 at a time synchronous with the leading edge of each pit, and holds the sampled logic level until a time synchronous with the leading edge of a next pit.

The latched output signal MSH from the D flip-flop 26 is supplied through a delay circuit 27 to an AND circuit 29. The delay circuit 27 delays the latched output signal MSH for a predetermined period and outputs a delayed signal MSHD (see FIG. 4(H)). The period for which the delay circuit 27 delays the latched output signal MSH is a period of time required for the 7T or more detecting circuit 28 to perform its processing, and represents the periods of about 5 channel clock pulses CK.

The 7T or more detecting circuit 28 detects pulse durations of the EFM signal S2, and outputs a detected pulse SP (see FIG. 4(I)) having a duration equal to one channel clock pulse if a detected pulse duration of the EFM signal S2 is 7T or more.

Figure 5:
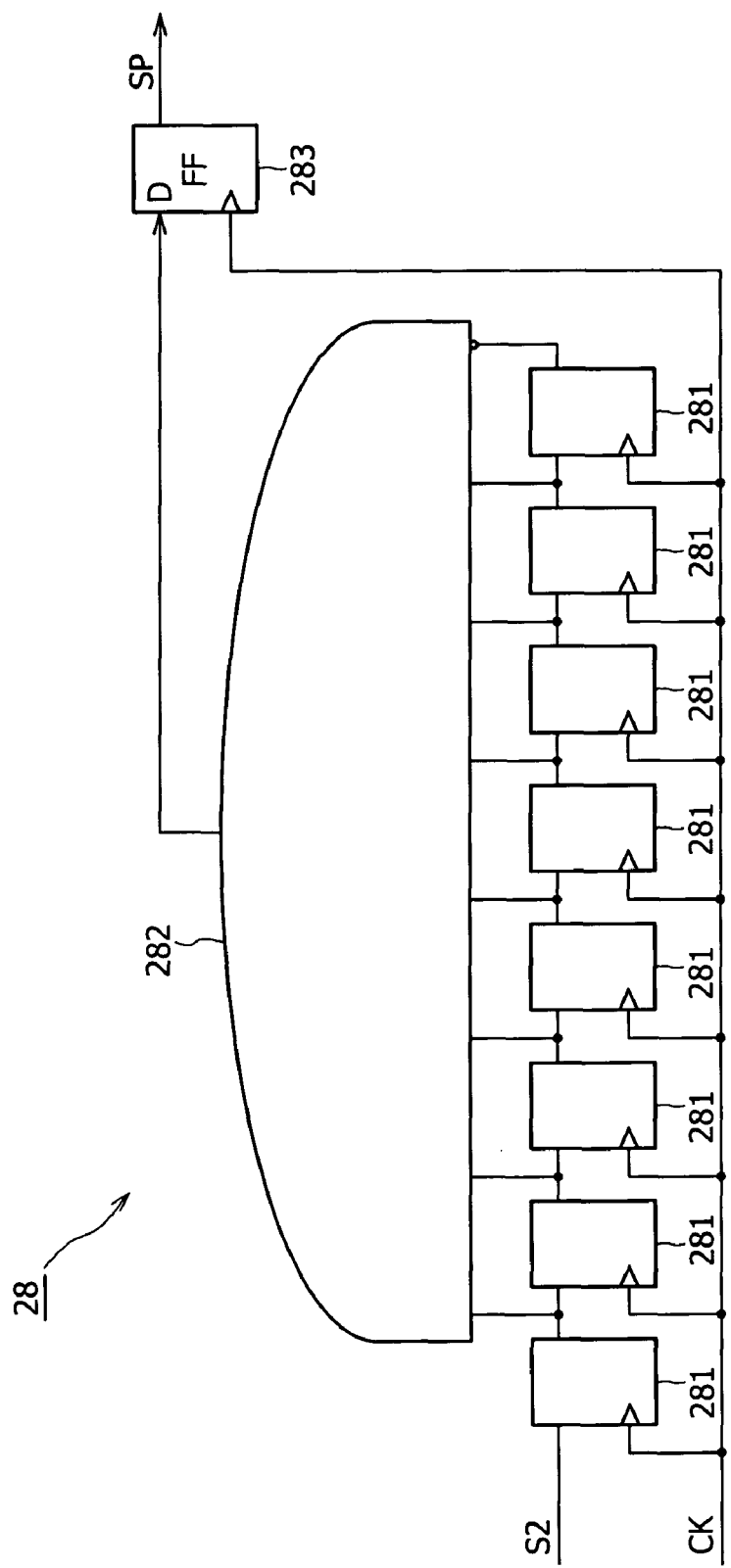
FIG. 5 is a block diagram of a 7T or more detecting circuit in the second modulating circuit shown in FIG. 3.

FIG. 5 shows in block form the 7T or more detecting circuit 28. As shown in FIG. 5, the 7T or more detecting circuit 28 comprises eight latch circuits 281A, 281B, 281C, 281D, 281E, 281F, 281G, 281H, an AND circuit 282, and a D flip-flop 283. Each of the eight latch circuits 281A to 281H latches the EFM signal S2 and transfers the latched signal to the following latch in synchronism with the channel clock pulses CK.

The AND circuit 282 is supplied with the latched output signals from the respective eight latch circuits 281A to 281H. The latched output signal from the final latch circuit 281H is inverted in logic level and then supplied to the AND circuit 282. The AND circuit 282 outputs an ANDed signal produced by ANDing the latched signals that are supplied parallel thereto. When the EFM signal S2 observed in terms of the period of the channel clock pulses CK has a succession of seven logic levels "1", i.e., when a pit having a length corresponding to 7T or more where T represents the basic period of the EFM signal S2 is to be formed, the AND circuit 282 outputs an ANDed signal having a logic level "1".

The D flip-flop 283 latches the output signal from the AND circuit 282 with a channel clock pulse CK, and outputs the detected pulse SP (see FIG. 4(I)). The detected pulse SP is supplied to the AND circuit 29 shown in FIG. 3.

The AND circuit 29 ANDs the detected pulse SP and the delayed signal MSHD from the delay circuit 27, and outputs an ANDed signal to a monostable multivibrator 30.

The monostable multivibrator 30 is triggered by the output signal from the AND circuit 29 to output a modulation pulse MMP (see FIG. 4(J)) having a duration shorter than the period of one channel clock pulse CK.

The duration of the modulation pulse MMP is set such that when the application of the laser beam L to the disc master 2 is temporarily stopped by the modulation pulse MMP, a reduction caused in the width of a pit by the temporary stoppage of the application of the laser beam L is about 10% of the average pit width on a compact disc that is produced from the disc master 2.

The modulation pulse MMP is supplied to an exclusive-OR circuit 32. The EFM signal S2 is delayed for a predetermined time by a delay circuit 31, and then supplied to the exclusive-OR circuit 32.

The delay circuit 31 delays the EFM signal S2 for the periods of about five clock pulses. The exclusive-OR circuit 32 exclusive-ORs a delayed EFM signal S2D (see FIG. 4(C)) output from the delay circuit 31 and the modulation pulse MMP, and outputs the modulation signal S3 (see FIG. 4(K)) that is generated by modulating the EFM signal S2 with the disc ID code SC1.

The period for which the delay circuit 31 delays the EFM signal S2, for the pit having a length corresponding to 7T or more, is selected such that when reproducing, switching of the logic level of the modulation signal S3 due to the modulation pulse MMP does not affect the timing of the edges of the EFM signal S2.

Specifically, the period for which the delay circuit 31 delays the EFM signal S2 is set such that switching of the logic level of the modulation signal S3 due to the modulation pulse MMP occurs at a time that is spaced a predetermined period from the timing of a positive-going edge of the EFM signal S2. In this embodiment, the delay circuit 31 delays the EFM signal S2 by the periods of about five clock pulses, so that a positive-going edge of the modulation pulse MMP is about 3T or more preceded by a corresponding positive-going edge of the EFM signal S2D.

Figure 6:
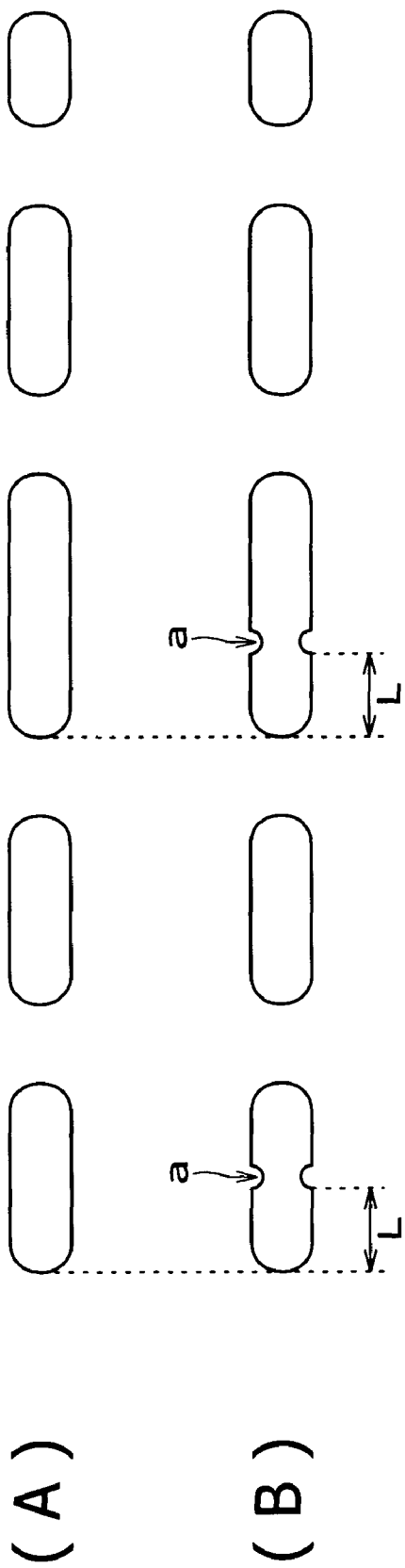
FIG. 6 is a plan view showing pit shapes of an optical disc produced by the optical disc recording apparatus according to the first embodiment of the present invention.

FIGS. 6(A) and 6(B) show in plan pit shapes of a compact disc produced from the disc master 2 and a conventional compact disc. As shown in FIG. 6(A), the conventional compact disc has pits and lands which are repeatedly formed that have lengths represented by integral multiples of the period T (basic period) of one channel clock pulse CK depending on audio data that are recorded.

As shown in FIG. 6(B), the compact disc produced from the disc master 2 has pits and lands which are repeatedly formed in the same manner as with the conventional compact disc. However, as shown by an arrow a in FIG. 6(B), the pits include pits whose lengths are equal to or greater than the period of 7T and which have a pit width locally reduced depending on the disc ID code SC1 at a position that is spaced a predetermined distance L from the edge of the pit. The disc ID code SC1 is recorded as the change or reduction in the pit width.

<Arrangement of Optical Disc Reproducing Apparatus>

Figure 7:
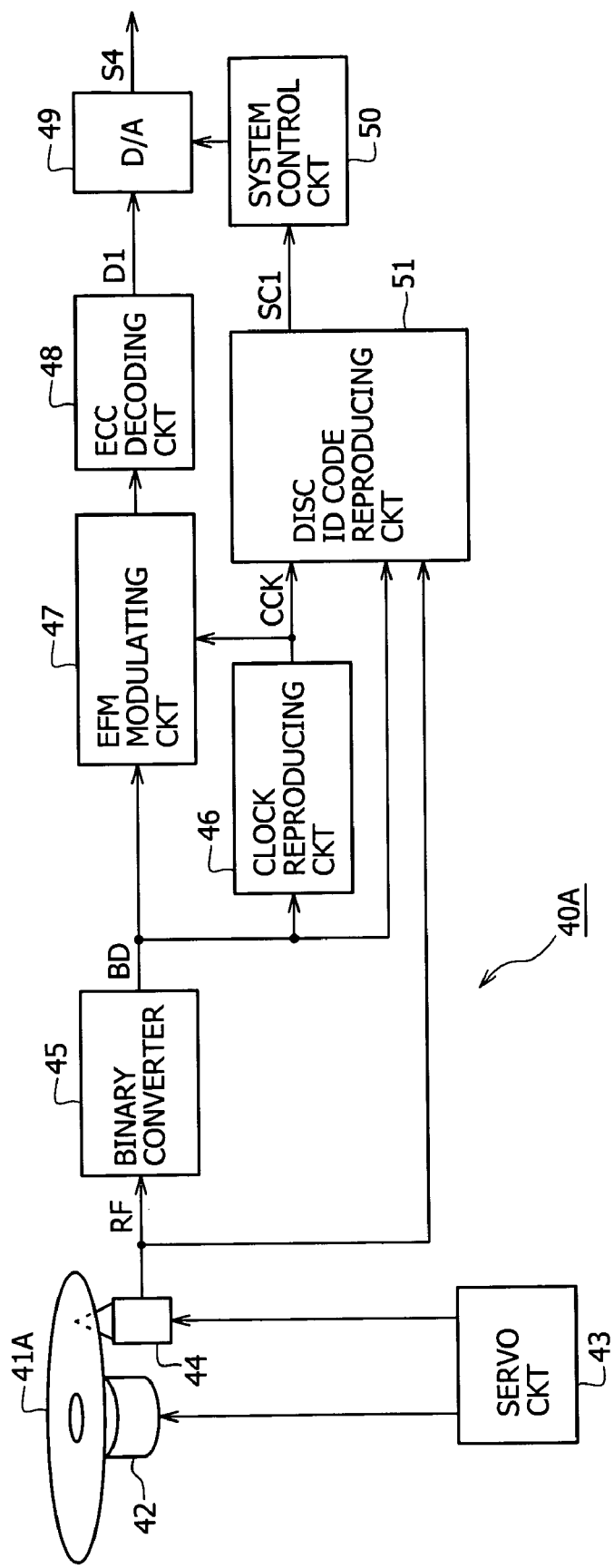
FIG. 7 is a block diagram of an optical disc reproducing apparatus for reproducing the optical disc produced by the optical disc recording apparatus according to the first embodiment of the present invention.

FIG. 7 shows in block form a compact disc player 40A for reproducing a compact disc 41A which is produced by the optical disc recording apparatus 1A according to the first embodiment of the present invention. As shown in FIG. 7, the compact disc player 40A has a spindle motor 42 for rotating the compact disc 41A at a constant linear velocity under the control of a servo circuit 43.

An optical pickup 44 applies a laser beam to the compact disc 41A and detects a laser beam returning from the compact disc 41A. The optical pickup 44 outputs a reproduced signal RF whose signal level changes depending on the amount of light of the returning laser beam. The signal level of the reproduced signal RF changes depending on pits recorded on the compact disc 41A.

Since the pit width of some pits is locally reduced by about 10% of the average pit width on the compact disc 41A, the signal level of the reproduced signal RF changes depending on the pit width. However, as the position where the pit width is locally reduced is spaced a predetermined distance from the edge of each pit so as not to affect the timing of the edges, the reproduced signal RF from those pits crosses a reference level for binary value identification at the same time as the reproduced signal RF from other pits which are free of reduced pit widths. The reproduced signal RF is supplied to a binary converter 45 and a disc ID code reproducing circuit 51.

The binary converter 45 converts the reproduced signal RF into a binary signal BD based on a predetermined reference level. Because the local reduction in the pit width of some pits on the compact disc 41A is about 10%, the binary signal BD does not reflect the local reduction in the pit width. The binary signal BD is supplied to a clock reproducing circuit 46, an EFM demodulating circuit 47, and the disc ID code reproducing circuit 51.

The clock reproducing circuit 46 has a PLL circuit and reproduces channel clock pulses CCK of the reproduced signal RF based on the binary signal BD from the binary converter 45.

The EFM demodulating circuit 47 successively latches the binary signal BD based on the channel clock pulses CCK, thereby reproducing data corresponding to the EFM signal S2. The EFM demodulating circuit 47 demodulates the reproduced data, and then divides the demodulated data into 8-bit signals based on the frame sync signal, deinterleaves the 8-bit signals, and outputs the deinterleaved signals to an ECC (Error Correcting Code) decoding circuit 48.

The ECC decoding circuit 48 corrects errors of the data output from the EFM demodulating circuit 47 based on an error correcting code added thereto, thereby reproducing and outputting audio data D1 to a digital-to-analog converter 49.

The digital-to-analog converter 49 converts the audio data D1 output from the ECC circuit 48 into analog data, and outputs the analog data as an analog audio signal S4. If the compact disc 41A is judged as an illegal copy by a system control circuit 50, then the digital-to-analog converter 49 is controlled by the system control circuit 50 to stop outputting the analog audio signal S4.

The system control circuit 50 comprises a computer which controls operation of the compact disc player 40A. When the lead-in area of the compact disc 41A is accessed, the system control circuit 50 determines whether or not the compact disc 41A is an illegal copy, based on the disc ID code SC1 output from the disc ID code reproducing circuit 51. When the system control circuit 50 judges the compact disc 41A as an illegal copy, then the system control circuit 50 stops outputting the analog audio signal S4 from the digital-to-analog converter 49.

The disc ID code reproducing circuit 51 decodes the reproduced signal RF into the disc ID code SC1, and outputs the disc ID code SC1.

Figure 8:
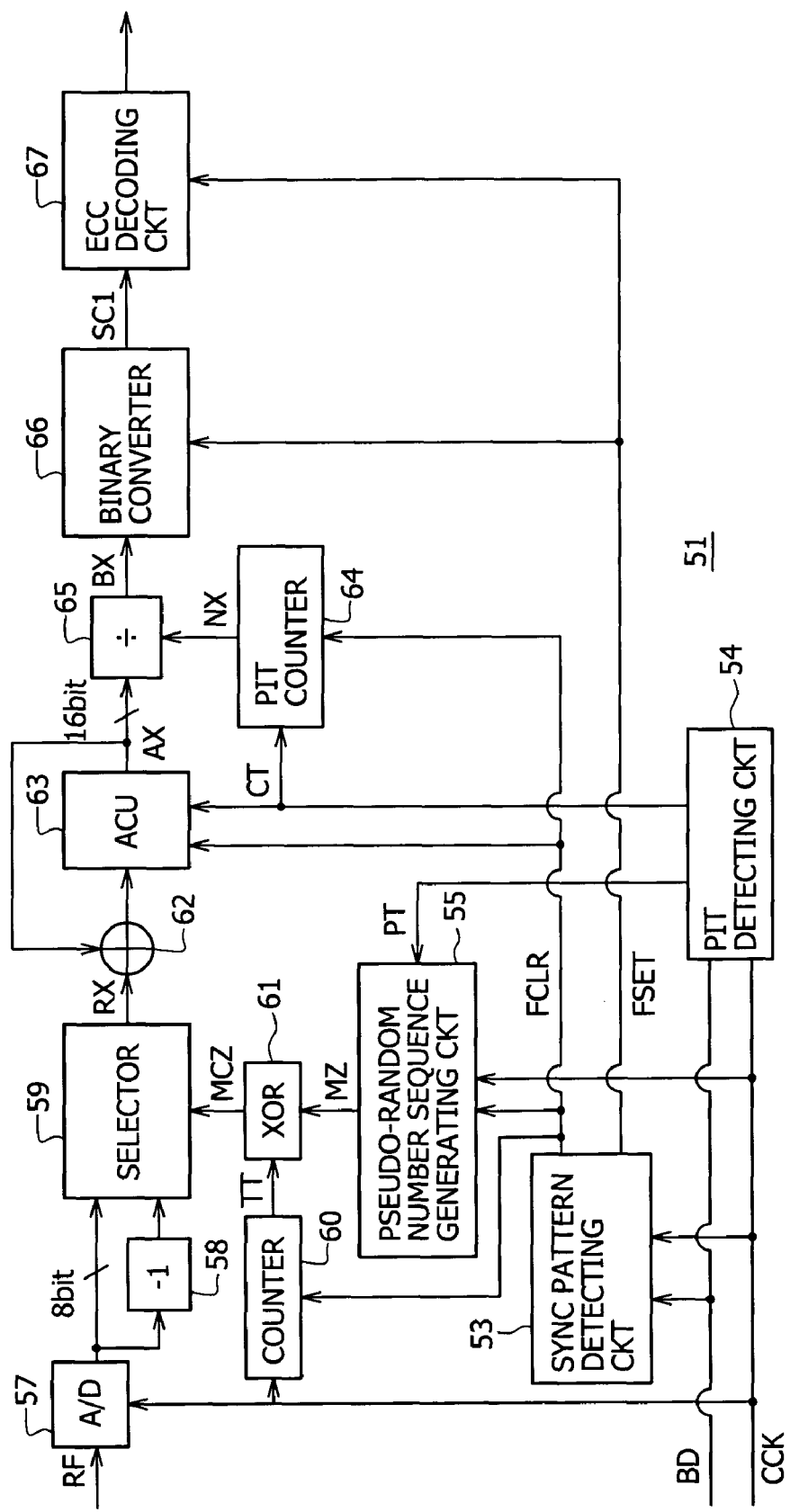
FIG. 8 is a block diagram of a disc ID code reproducing circuit in the optical disc reproducing apparatus shown in FIG. 7.

FIG. 8 shows in block form details of the disc ID code reproducing circuit 51. FIGS. 9(A) through 9(E) are timing charts showing the waveforms of output signals in the disc ID code reproducing circuit 51.

Figure 9:
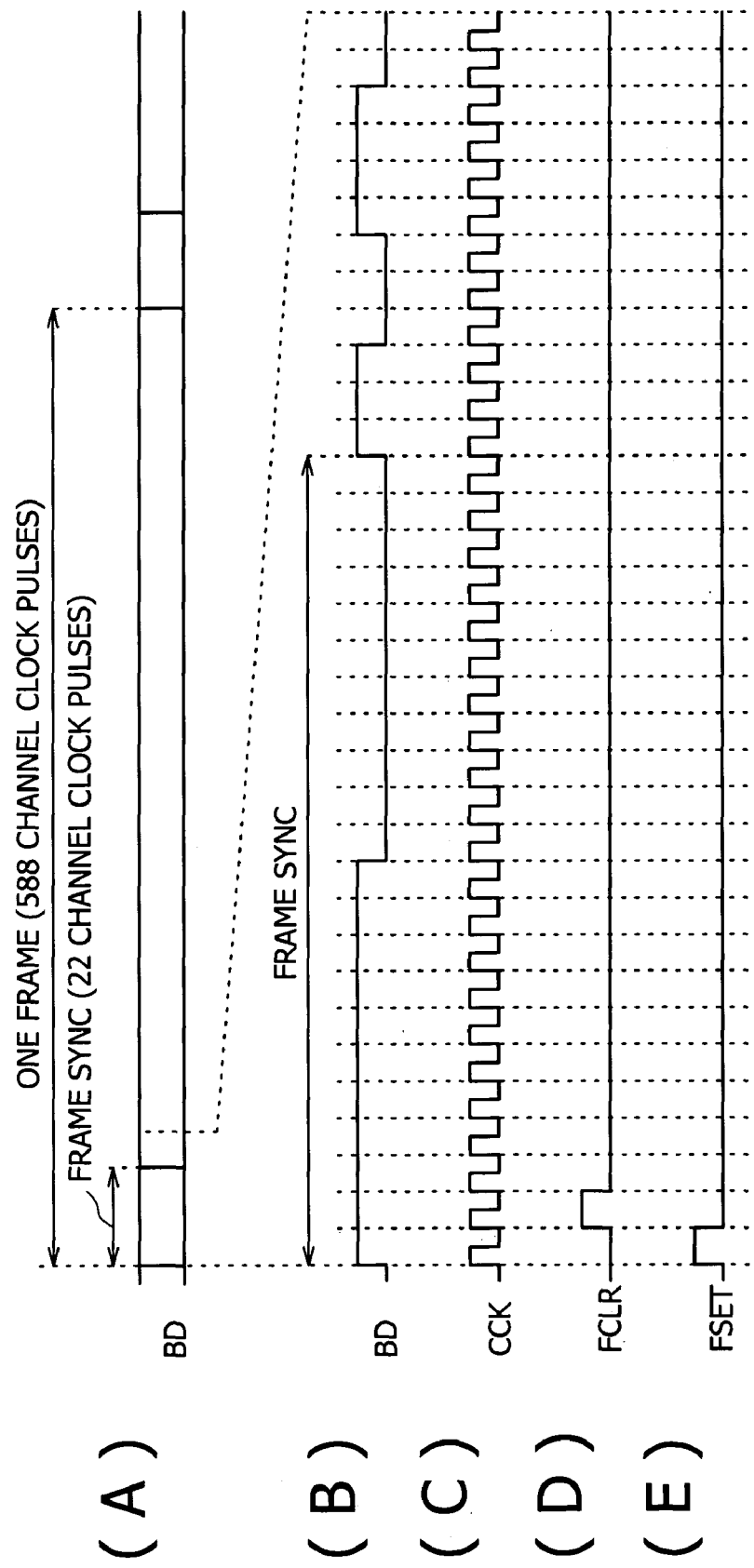
FIG. 9 is a timing chart illustrative of operation of the disc ID code reproducing circuit shown in FIG. 8.

The disc ID code reproducing circuit 51 has a synchronous pattern detecting circuit 53 which successively latches binary signals BD (see FIGS. 9(A) and 9(B)) from the binary converter 45 with the channel clock pulses CCK (see FIG. 9(C)) from the clock reproducing circuit 46, and determines the successive logic levels of the binary signals BD to detect a frame sync signal.

Based on the detected frame sync signal, the synchronous pattern detecting circuit 53 outputs a set pulse FSET (see FIG. 9(E)) whose signal level is high during the period of one channel clock pulse CCK at the start of each frame, and a clear pulse FCLR (see FIG. 9(D)) whose signal level is high during the period of one channel clock pulse CCK, following the set pulse FSET.

A pit detecting circuit 54 is of a structure identical to the 7T or more detecting circuit 28 of the optical disc recording apparatus 1A. The pit detecting circuit 54 successively transfers the binary signals BD based on the channel clock pulses CCK to detect the timing of a binary signal BD which corresponds to a pit having a length equal to or larger than the period 7T. The pit detecting circuit 54 generates and outputs a high-level signal PT whose signal level goes high in synchronism with the start of the detected pit.

The pit detecting circuit 54 also outputs a gate signal CT whose signal level goes high at a time that is a predetermined period later than the high-level signal PT. The gate signal CT corresponds to the modulation pulse MMP in the second modulating circuit 7, but differs therefrom in that the gate signal CT goes high in level at each pit whose length is equal to or larger than the period 7T.

A pseudo-random number generating circuit 55, which has a ROM incorporated therein, initializes addresses with a clear pulse FCLR from the synchronous pattern detecting circuit 53. Then the circuit 55 steps through the addresses based on the channel clock pulses CCK to access the ROM, thereby generating M-sequence random number data corresponding to the M-sequence random number data MS generated by the optical disc recording apparatus 1A.

The pseudo-random number generating circuit 55 also latches the M-sequence random number data with the high-level signal PT from the pit detecting circuit 54, thereby latching the M-sequence random number data at the timing of the start of a pit whose length is equal to or larger than the period 7T, and thereafter outputs an M-sequence latched signal MZ whose latched logic level continues until the start of a next pit whose length is equal to or larger than the period 7T.

The reproduced signal RF is converted by an analog-to-digital converter 57 into an 8-bit digital reproduced signal based on the channel clock pulses CCK. The digital reproduced signal is directly supplied to a selector 59. The digital reproduced signal is also inverted in polarity by a polarity inverting circuit 58, and then supplied to the selector 59.

A counter 60 comprises a 4-bit counter for counting channel clock pulses CCK. The counter 60 is cleared by a clear pulse FCLR that is output from the synchronous pattern detecting circuit 53. The counter 60 outputs the most significant bit of the counter value as a toggle signal TT. The toggle signal TT corresponds to the toggle signal TGL generated in the optical disc recording apparatus 1A. The toggle signal TT is supplied to an exclusive-OR circuit 61.

The exclusive-OR circuit 61 generates an exclusive-ORed signal MCZ by exclusive-ORing the M-sequence latched signal MZ from the pseudo-random number sequence generating circuit 55 and the toggle signal TT from the counter 60, and supplies the generated exclusive-ORed signal MCZ to the selector 59.

Depending on the logic level of the exclusive-ORed signal MCZ from the exclusive-OR circuit 61, the selector 59 selects and outputs either one of the digital reproduced signal directly supplied from the analog-to-digital converter 57 and the polarity-inverted digital reproduced signal from the polarity inverting circuit 58.

Specifically, when the exclusive-ORed signal MCZ is of a logic level "1", the selector 59 selects and outputs the digital reproduced signal directly supplied from the analog-to-digital converter 57, and when the exclusive-ORed signal MCZ is of a logic level "0", the selector 59 selects and outputs the polarity-inverted digital reproduced signal. Therefore, selector 59 reproduces the logic level of the disc ID code SC1 which has been modulated by the M-sequence signal MS and the toggle signal TGL into multi-valued data, and outputs the multi-valued data as reproduced data RX to an adder 62.

The adder 62, which comprises a 16-bit digital adder, adds the reproduced data RX and output data AX of an accumulator 63, which accumulates output data from the adder 62, and outputs the sum data. The accumulator 63 comprises a 16-bit memory for holding output data from the adder 62, and feeds back the accumulated data to the adder 62. The adder 62 and the accumulator 63 jointly serve as an accumulative adder.

Specifically, after the accumulator 63 clears its accumulated data with a clear pulse FCLR from the synchronous pattern detecting circuit 54, the accumulator 63 reads output data from the adder 62 at the timing of a gate signal CT from the pit detecting circuit 54. The adder 62 accumulates logic values of the reproduced data RX from the selector 59 in successive frames. The accumulator 63 outputs an accumulated value AX to a divider 65.

A pit counter 64 clears its count with a clear pulse FCLR from the synchronous pattern detecting circuit 53, then counts gate signals CT from the pit detecting circuit 54 to count pits accumulated by the accumulator 63, and outputs a count value NX to the divider 65.

The divider 65 divides the accumulated value AX from the accumulator 61 by the count value NX from the pit counter 64, thereby averaging the logic values of the reproduced data RX from the selector 59, and supplies an averaged output signal BX to a binary converter 66.

The binary converter 66 converts the averaged output signal BX from the divider 65 into a binary signal with a predetermined reference value at the timing of the positive-going edge of a set pulse FSET from the synchronous pattern detecting circuit 53, and outputs the binary signal as reproduced disc ID code SC1. That is, the reproduced data RX of the disc ID code SC1 which is reproduced by the selector 59 is converted into the binary disc ID code SC1, which is output to an ECC decoding circuit 67.

The ECC decoding circuit 67 corrects errors of the disc ID code SC1 based on an error correcting code added thereto, and outputs the error-corrected disc ID code SC1.

<Operation of the First Embodiment>

In a process of manufacturing the compact disc 41A according to the first embodiment, the disc master 2 is exposed to a recording laser beam based on the digital audio signal D1 output from the digital audio tape recorder 10 in the optical disc recording apparatus 1A shown in FIG. 1, producing a mother disc. The compact disc 41A according to the first embodiment is produced from the mother disc thus formed.

In exposing the disc master 2 to the recording laser beam, the digital audio signal D1 is converted by the first modulating circuit 11 into an EFM signal S2 whose signal level switches at a period which is an integral multiple of the basic period T which is represented by the period T of one channel clock pulse CK. In the lead-in area, TOC data, rather than the digital audio signal D1, are similarly converted into an EFM signal S2.

The EFM signal S2 is then converted by the second modulating circuit 7 into a modulation signal S3, which is recorded on the disc master 2 by the optical modulator 6. Therefore, the digital audio signal D1 and the TOC data are recorded on the disc master 2 as a repeated sequence of pits and lands whose length is an integral multiple of the basic length corresponding to the period of one channel clock pulse CK.

For recording the modulation signal S3 in an area of the disc master 2 other than the lead-in area, the modulation signal S3 is generated so as to depend on the signal level of the EFM signal S2. For recording the modulation signal S3 in the lead-in area of the disc master 2, the modulation signal S3 is generated by locally switching the signal level of the EFM signal S2, generating pits having a locally reduced width in the sequence of pits on the disc master 2. That is, the pit width of some pits is modulated to record the disc ID code SC1 on the disc master 2.

In the disc ID code generating circuit 12, the modulo-N counter 121 counts frame clock pulses FCK and outputs a count value CT1. The disc ID code table circuit 122 is accessed based on the count value to produce a low-frequency binary number where one bit is assigned to one frame, thereby generating a disc ID code SC1 and an error correcting code therefor.

In the second modulating circuit 7, the pseudo-random number sequence generating circuit 23 generates an M-sequence random number data MS repeated frame by frame, in synchronism with channel clock pulses CK. The exclusive-OR circuit 25 exclusive-ORs the M-sequence random number data MS, the toggle signal TGL from the counter 24, and the disc ID code SC1. Thus the disc ID code SC1 is modulated with the random number data MS and the toggle signal TGL.

Specifically, as logic level "1" and logic level "0" appear with equal probability in the M-sequence random number data MS, and logic level "1" and logic level "0" appear with equal probability in the toggle signal TGL, the disc ID code SC1 is modulated into an exclusive-ORed signal MS1 where logic level "1" and logic level "0" appear with equal probability.

The D flip-flop 26 latches the exclusive-ORed signal MS1 with a positive-going edge of the EFM signal S2 which corresponds to the edge of each pit. The 7T or more detecting circuit 28 detects a positive-going edge of the signal level of the EFM signal S2 which corresponds to a pit having a length corresponding to 7T or more where T represents the basic period T. The AND circuit 29 selects the latched signal from the D flip-flop 26 in synchronism with the positive-going edge of the signal level detected by the 7T or more detecting circuit 28. The output signal from the AND circuit 29 triggers the monostable multivibrator 30, which applies its output signal or modulation pulse MMP to the exclusive-OR circuit 32 that locally switches the signal level of the EFM signal S2.

The disc ID code SC1 is recorded on the disc master 2 as local reductions in the pit width of pits whose length is equal to or greater than the period 7T. Specifically, while pits are being successively generated on the disc master 2, the pitch width is locally reduced when the exclusive-ORed signal MS1 produced by exclusive-ORing the M-sequence random number data MS, the toggle signal TGL, and the disc ID code SC1 is of logic level "1" and the pit length is 7T or more.

In switching the logic level of the EFM signal S2 to generate the modulation signal S3 to produce a pit having a locally reduced width, the delay circuit 31 delays the EFM signal S2 with respect to the modulation pulse MMP output from the monostable multivibrator 30, and supplies the delayed EFM signal S2D to the exclusive-OR circuit 32. Therefore, the switching of the logic level of the modulation signal S3 does not affect the timing of the edges of the EFM signal S2.

Specifically, if the pit width is to be reduced for pits whose length is equal to or greater than the period 7T, then a positive-going edge of the modulation pulse MMP is about 3T or more preceded by a corresponding positive-going edge of the EFM signal S2D, so that switching of the logic level of the modulation signal S3 corresponding to the modulation pulse MMP occurs at a time that is spaced a predetermined period (which corresponds to the distance L from the edge of a pit as shown in FIG. 6(B)) from the timing of a positive-going edge of the EFM signal S2.

In this manner, the disc ID code SC1 is recorded as an example of auxiliary information without affecting the edge information of each pit which serves as a reference for reproducing the digital audio signal and the TOC data.

The pulse duration of the modulation pulse MMP output from the monostable multivibrator 30 is set to a value shorter than the period of one channel clock pulse CK, for thereby generating a pit having a locally reduced width which is 10% smaller than the average pit width. This pit width reduction is effective to prevent the reproduced signal RF from being erroneously identified for binary levels due to the recorded disc ID code SC1.

By recording the disc ID code SC1 by locally reducing the pit width by 10% and also by modulating the disc ID code SC1 with the M-sequence random number data MS where logic level "1" and logic level "0" appear with equal probability, a change in the reproduced signal RF due to the change of the pit width is observed as noise added to the reproduced signal RF, making it difficult to observe and find the disc ID code SC1 and also to copy the disc ID code SC1.

In addition, since one bit of the disc ID code SC1 is assigned to one frame, the disc ID code SC1 can reliably be reproduced even if the reproduced signal is varied due to noise or the like.

A compact disc 41A produced from the disc master 2 thus generated is then reproduced by the compact disc player 40A shown in FIG. 7. In the compact disc player 40A, the optical pickup 44 applies a laser beam to the compact disc 41A, and detects a laser beam returning from the compact disc 41A. The optical pickup 44 outputs a reproduced signal RF whose signal level changes depending on the amount of light of the returning laser beam. The signal level of the reproduced signal RF changes depending on the width pits recorded on the compact disc 41A. The reproduced signal RF from the optical pickup 44 is converted by the binary converter 45 into a binary signal BD which is identified for binary levels, EFM-demodulated, and deinterleaved by the EFM demodulating circuit 47. The output signal from the EFM demodulating circuit 47 is error-corrected by the ECC decoding circuit 48, thereby reproducing a digital audio signal D1.

On the compact disc 41A, pits whose lengths are equal to or greater than the period of 7T have a pit width locally reduced at a position that is spaced at least a distance corresponding to the period of 3T from the edge (each of both leading and trailing edges) of the pit. The beam spot of the laser beam scans the edges of those pits and the positions thereof where the pit width is locally reduced, at different times. Accordingly, the reproduced signal RF is free of adverse effects due to the local reduction in the pit width of those pits.

Since the signal level detected from the pits in the vicinity of their edges is prevented from changing due to the local reduction in the pit width, the compact disc 41A with the disc ID code SC1 recorded as auxiliary information thereon can normally be reproduced on ordinary compact disc players.

For reproducing the digital audio signal D1 from the compact disc 41A, the disc ID code SC1 recorded as a reduced pit width in the lead-in area of the compact disc 41A is reproduced in advance. If the disc ID code SC1 cannot properly be reproduced, then the compact disc 41A is judged as an illegal copy by the system control circuit 50, and the digital-to-analog converter 49 is controlled to stop its digital-to-analog conversion process by the system control circuit 50.

Specifically, when the disc ID code SC1 is reproduced from the lead-in area of the compact disc 41A, the synchronous pattern detecting circuit 53 shown in FIG. 8 detects a frame sync signal, and the pseudo-random number sequence generating circuit 55 generates an M-sequence random number data MS corresponding to the recorded M-sequence random number data MS based on the detected frame sync signal.

The analog-to-digital converter 57 converts the reproduced signal RF into a digital reproduced signal (EFM signal). The selector 59 selects the digital reproduced signal (EFM signal) or the polarity-inverted digital reproduced signal based on an exclusive-ORed signal MCZ which is produced by exclusive-ORing M-sequence random number data MZ and a toggle signal TT, thereby producing reproduced data RX which comprises multi-valued data representing the logic levels of the disc ID code SC1.

Since the pit width is reduced only by 10%, the reproduced data RX has a very poor SN ratio in terms of one sample. The accumulator 63 and the adder 62 accumulate reproduced data RX frame by frame, and the divider 65 divides the accumulated value to produce an average value, thus improving the SN ratio.

The output data BX from the divider 65 is converted by the binary converter 66 into binary data representing the disc ID code SC1. Thereafter, the disc ID code SC1 is error-corrected by the ECC decoding circuit 67 and then output to the system control circuit 50.

With the above arrangement, since a sequence of pseudo-random number data (M-sequence random number data MS) generated from the linear feedback shift register is periodically inverted, the pseudo-random number data thus generated cannot be generated by any linear feedback shift registers. Using the sequence of pseudo-random number data, it is possible to make it difficult to analyze the disc ID code SC1 reproduced from the compact disc 41A, and hence to reject an illegal copy based on the disc ID code SC1.

The disc ID code SC1 is produced by latching, with a positive-going edge of the EFM signal S2, the combination of the sequence of pseudo-random number data MS generated by the linear feedback shift register and the periodically changing toggle signal TGL. Anyone who attempts to produce an illegal copy needs to accurately reproduce the pseudo-random number data, the toggle signal period, and the latching position, and finds it difficult to record the disc ID code SC1. The toggle signal TGL to be combined with the sequence of pseudo-random number data MS represents a repeated pattern of logic levels "1" and "0". As the signal used to modulate the disc ID code SC1 has logic levels "1" and "0" that occur with equal probability, the disc ID code SC1 can be recorded in such a manner that they cannot easily be distinguished from noise. Consequently, it is difficult to find and analyze the disc ID code SC1. Furthermore, when the compact disc 41A is reproduced, the disc ID code SC1 can be reproduced without being adversely affected by noise.

Inasmuch as the signal produced by combining the sequence of pseudo-random number data MS and the periodically changing toggle signal TGL has logic levels "1" and "0" that occur with equal probability, the disc ID code SC1 can reliably be reproduced even if it is applied to pits whose lengths are equal to or greater than the period of 7T and which appear uncertainly in one frame.

The selector 59 selects a digital reproduced signal based on the exclusive-ORed signal MCZ which is produced based on the M-sequence random number data MZ and the toggle signal TT, for reproducing the disc ID code SC1. Consequently, the disc ID code SC1 which has been recorded in a manner not to be easily found and analyzed can reliably be reproduced.

Modifications of the First Embodiment

In the first embodiment described above, the pit width of pits whose lengths are equal to or greater than the period of 7T is changed to record the disc ID code. According to the present invention, however, if the reproducing system has a sufficient margin for jitter of the reproduced signal, then the pit width of pits whose lengths are equal to or greater than the period of 6T may be changed to record the disc ID code.

In the first embodiment described above, the pit width is reduced at a position which is spaced a predetermined distance from the edge of a pit. However, as shown in FIG. 10(A), the pit width of a pit having a certain length or greater may be reduced at the center of the pit, or as shown in FIG. 10(B), the pit width of a pit having a certain length or greater may be increased at the center of the pit, or as shown in FIG. 10(C), the disc ID code may be recorded in three values by locally increasing and reducing the pit width.

Alternatively, as shown in FIG. 10(D), the pit width of a pit may be changed over a length which is greater than the length corresponding to the period of one channel clock pulse.

In the first embodiment described above, the disc ID code which is represented by one bit per one frame is recorded. However, a disc ID code which is represented by one bit may be assigned to a predetermined number of pits each having a predetermined length or more, or a disc ID code which is represented by a plurality of bits may successively cyclically be assigned to pits each having a predetermined length or more for a predetermined period.

If a disc ID code which is represented by one bit is assigned to a predetermined number of pits, then the pit counter 64 and the divider 65 in the reproducing system may be dispensed with.

Second Embodiment

According to the first embodiment described above, the pit width is locally modulated by auxiliary information. According to a second embodiment of the present invention to be described below, the recorded position of a pit is modulated by auxiliary information, i.e., wobbled in a direction perpendicular to the direction in which the pit is scanned by a laser beam, i.e., a direction transverse to the tracks.

In the first embodiment, the disc ID code is recorded as a changed pit width. In the second embodiment, an encrypted digital audio signal is recorded by pits and lands, and key information required to decrypt the encrypted digital audio signal is recorded as auxiliary information.

Figure 11:
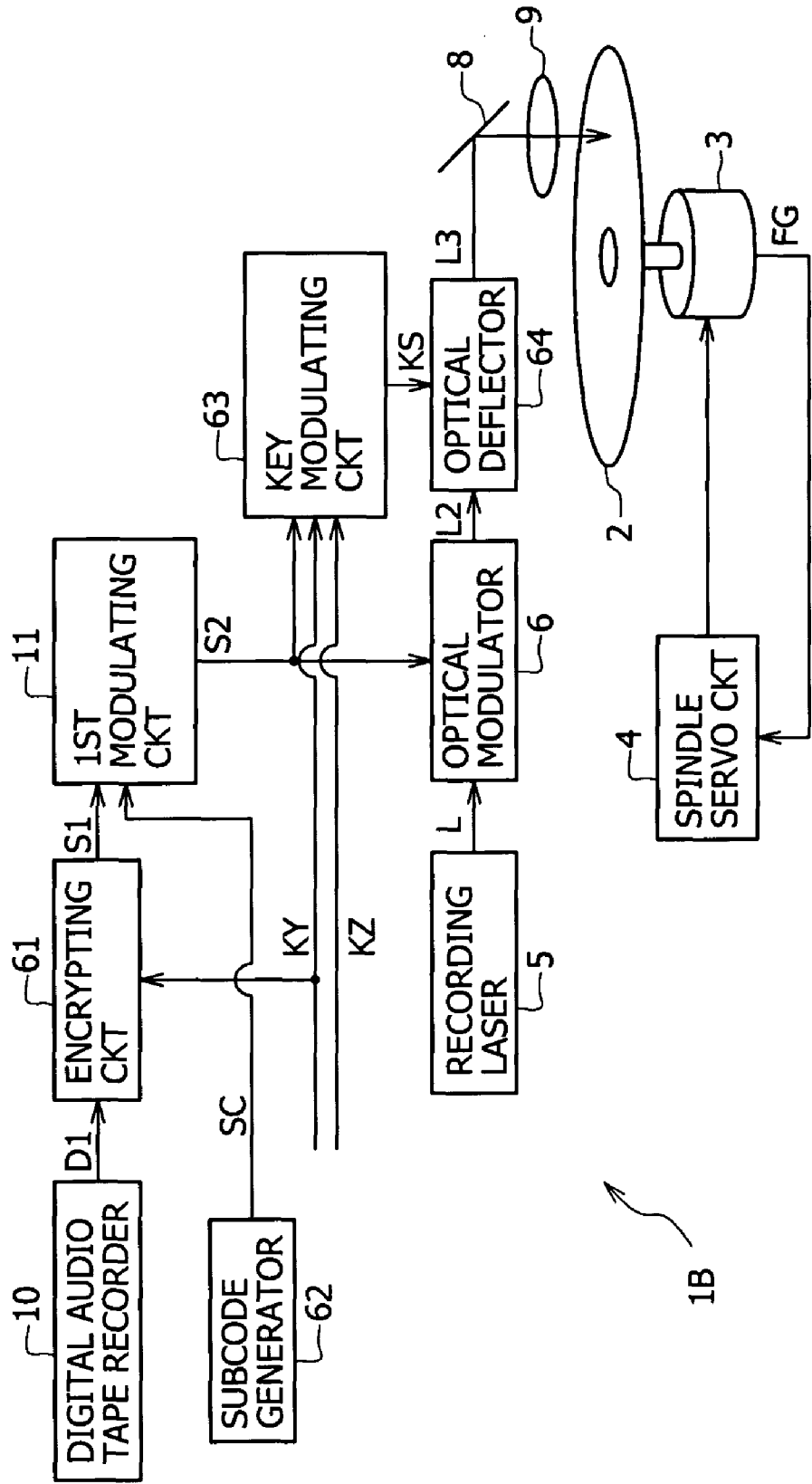
FIG. 11 is a block diagram of an optical disc recording apparatus according to a second embodiment of the present invention.

FIG. 11 shows in block form an optical disc recording apparatus 1B according to the second embodiment. Those parts of the optical disc recording apparatus 1B which are identical to those of the optical disc recording apparatus 1A according to the first embodiment shown in FIG. 1 are denoted by identical reference characters, and will not be described in detail below.

In the second embodiment, the digital audio signal D1 from the digital audio tape recorder 10 is supplied to an encrypting circuit 61, which encrypts the digital audio signal D1 based on encryption key information KY. The encrypted digital audio signal S1 is supplied to the first modulating circuit 11.

The first modulating circuit 11 performs a predetermined data processing operation for compact discs based on the encrypted digital audio signal S1 and subcode data supplied from a subcode generator 62, generating an EFM signal S2.

The EFM signal S2 from the first modulating circuit 11 is supplied to the optical modulator 6, which modulates the laser beam L1 from the recording laser 5 with the EFM signal S2. The modulated laser beam L1 is applied through an optical deflector 64 to the disc master 2, which is exposed to the modulated laser beam L1.

A key modulating circuit 63 generates a key modulating signal KS from the encryption key information KY. The optical deflector 64 deflects the laser beam L2 based on the key modulating signal KS from the key modulating circuit 63 to displace the scanning position of the laser beam L2 on the disc master 2 in the radial direction thereof, thereby displacing the position of a pit on the disc master 2 in the radial direction thereof, i.e., in the direction perpendicular to the direction in which the laser beam L2 scans the disc master 2.

Figure 12:
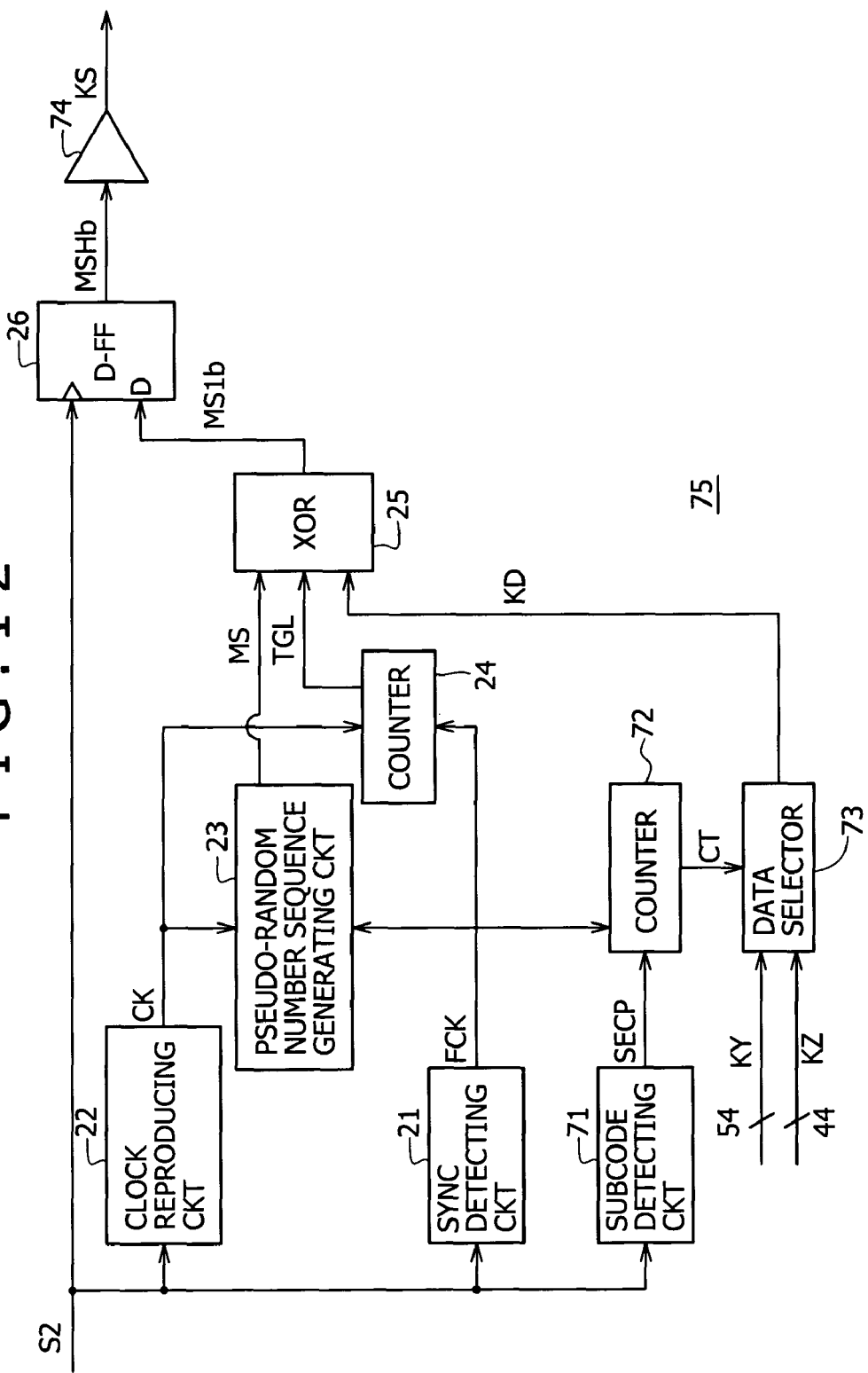
FIG. 12 is a block diagram of a key modulating circuit in the optical disc recording apparatus shown in FIG. 11.

FIG. 12 shows in block form details of the key modulating circuit 63. As shown in FIG. 12, the key modulating circuit 63 comprises a synchronous detecting circuit 21, a clock reproducing circuit 22, a pseudo-random number sequence generating circuit 23, a counter 24, an exclusive-OR circuit 25, and a D flip-flop 26 which are identical to those of the second modulating circuit 7 according to the first embodiment.

According to the second embodiment, a subcode detecting circuit 71 detects a subcode from the EFM signal S2 and decodes the subcode. The subcode detecting circuit 71 monitors time information contained in the decoded subcode, and outputs a one-second detected pulse SECP whose signal level goes high each time the time information changes one second. According to the compact disc format, since 98 frames are assigned to one second, the subcode detecting circuit 71 outputs a one-second detected pulse SECP whose signal level goes high in the period of 98 frame clock pulses FCK.

The one-second detected pulse SECP is supplied to a reset terminal of a counter 72. The counter 72 counts frame clock pulses FCK from the synchronous detecting circuit 21. When one-second detected pulse SECP goes high, the counter 72 resets its count output CT. Therefore, the counter 72 serves as a ring counter whose count value CT cycles in the period of one second, and the count value CT changes in synchronism with the frame clock pulses FCK.

The count value CT output from the counter 72 is supplied to a data selector 73. The data selector 73 outputs data held thereby which is addressed by the count value CT from the counter 72.

Since the count value CT output from the counter 72 successively cyclically changes as many times as the number of frames (98 frames) in one second in synchronism with the synchronous pattern, the data selector 73 is addressed by the count value CT to successively output 98 kinds of pieces of data in synchronism with the synchronous pattern.

As the count value CT output from the counter 72 is cycled in every second by the one-second detected pulse SECP, the data selector 73 repeatedly outputs 98 kinds of pieces of data in the successive periods of seconds.

The data selector 73 outputs 98 kinds of pieces of data, each comprising 1-bit data, repeatedly in the successive periods of seconds in synchronism with the synchronous pattern. 54 bits of encryption key information KY are assigned to some data of the 98-bit data, and bits of meaningless data are assigned to the remaining 44 bits of the 98-bit data. In the present embodiment, inherent-value data KZ are assigned as the meaningless data.

The data selector 73 supplies output data KD to the exclusive-OR circuit 25.

Figure 13:
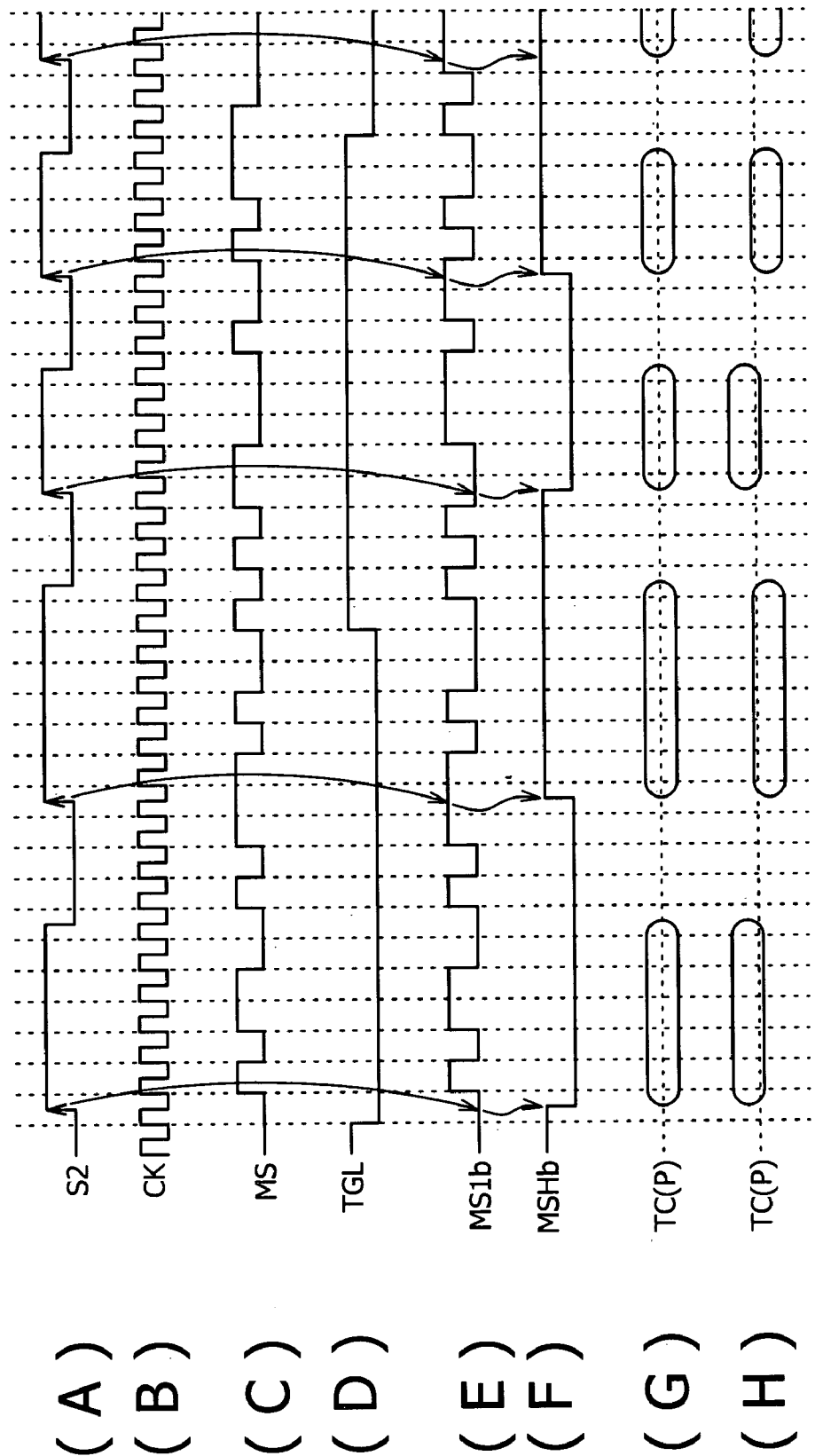
FIG. 13 is a timing chart illustrative of operation of the key modulating circuit shown in FIG. 12.

The exclusive-OR circuit 25 exclusive-ORs the M-sequence random number data MS (see FIG. 13(C)), the toggle signal TGL (see FIG. 13(D)) from the counter 24, and the output data KD from the data selector 73, and outputs an exclusive-ORed signal MS1b (see FIG. 13(E)).

Specifically, when the toggle signal TGL is of level "0", if the output data KD from the data selector 73 is of logic level "0", then the exclusive-OR circuit 25 outputs an exclusive-ORed signal MS1b which is represented by the logic level of the M-sequence random number data MS. Conversely, if the output data KD from the data selector 73 is of logic level "1", then the exclusive-OR circuit 25 outputs an exclusive-ORed signal MS1b which is represented by an inversion of the logic level of the M-sequence random number data MS. The exclusive-OR circuit 25 therefore modulates the encryption key information KY represented by the output data KD from the data selector 73 with the M-sequence random number data MS and the toggle signal TGL. The exclusive-ORed signal MS1b from the exclusive-OR circuit 25 is supplied to the D terminal of the D flip-flop 26.

The D flip-flop 26 has a clock terminal supplied with the EFM signal S2 (see FIG. 13(A)). Therefore, the D flip-flop 26 produces a latched output signal MSHb (see FIG. 13(F)) which represents the levels of the exclusive-ORed signal MS1b that are latched at respective positive-going edges of the EFM signal S2.

In the present embodiment, an optical disc produced from the disc master 2 which is exposed to a laser beam modulated by the signal level of the EFM signal S2 contains pits having scanning start edges corresponding to the positive-going edges of the EFM signal S2.

The D flip-flop 26 latches output data MS1b produced at the time to start forming each pit, of the output data MS1b of the exclusive-OR circuit 25 which are successively output in the period of channel clock pulses CK (see FIG. 13(B)) which serve as a reference period for forming pits, and holds the logic level of the latched output data MS1b until the formation of at least one pit is completed.

The D flip-flop 26 outputs an output signal MSHb through an amplifier 74 as the output signal KS of the key modulating circuit 63. The amplifier 74 is a drive amplifier for driving the optical deflector 64. The output signal KS from the amplifier 74 changes the position of the laser beam spot on the disc master 2 in the radiation direction thereof throughout a pit.

The amplifier 74 has a gain set such that the position of the laser beam spot on the disc master 2 is displaced 1/50 of the track pitch at maximum, thereby preventing data recorded as a sequence of pits by the optical disc recording apparatus 1B from being impaired.

According to the second embodiment, the disc master 2 manufactured by the optical disc recording apparatus 1B is developed and then electroformed into a mother disc. A stamper is then produced using the mother disc. Thereafter, an optical disc 41B is produced from the stamper in the same manner as with an ordinary compact disc production process.

According to the second embodiment, the optical disc 41B contains encrypted audio data D1 recorded as a sequence of pits and encryption key information KY recorded as radially displaced pits.

On ordinary compact discs, pits are successively formed centrally on tracks depending on the EFM signal S2, recording audio data depending on the lengths of the pits and the intervals between the pits (see FIG. 13(G)). On the optical disc 41B according to the second embodiment, encrypted audio data are recorded depending on the lengths of the pits and the intervals between the pits, and key information KY for decrypting the encrypted audio data is recorded as radially displaced pits (see FIG. 13(H)).

Figure 14:
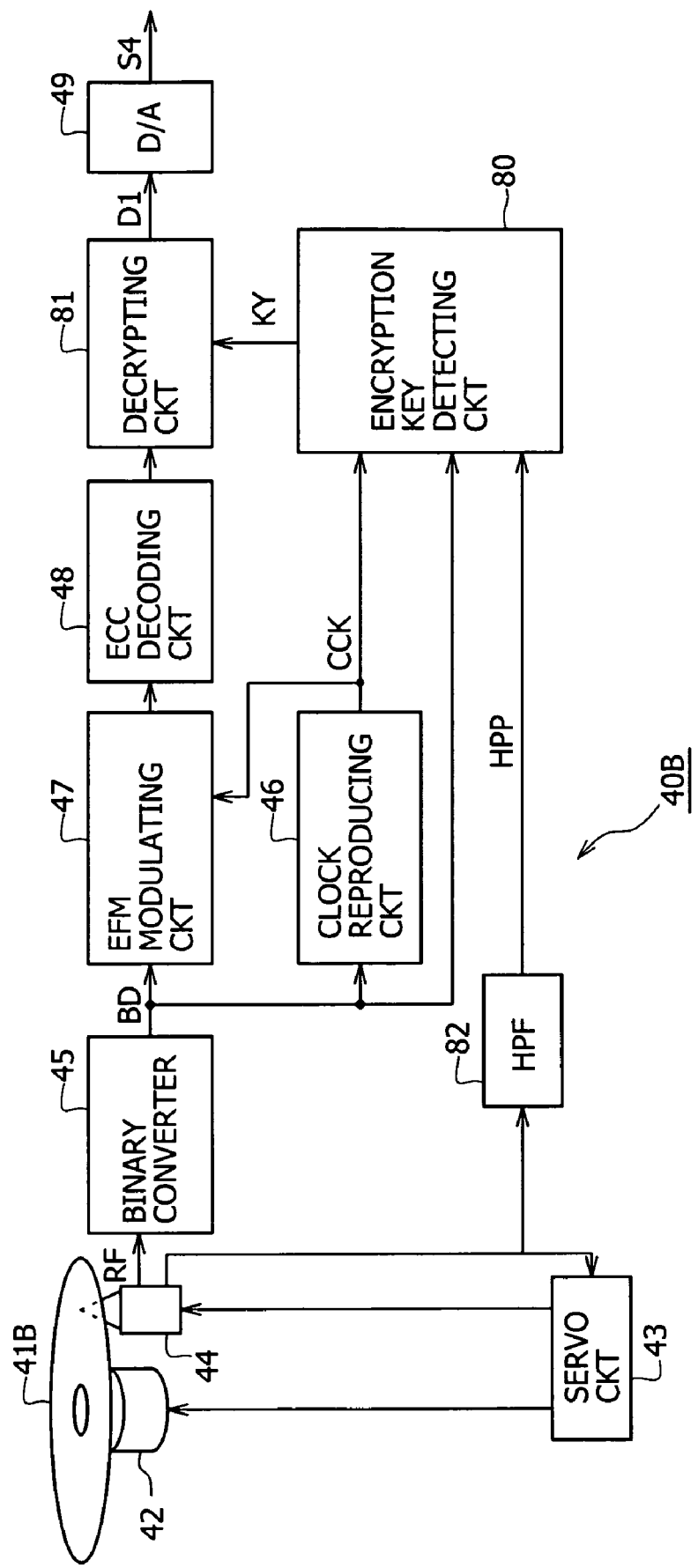
FIG. 14 is a block diagram of an optical disc reproducing apparatus for reproducing an optical disc produced by the optical disc recording apparatus according to the second embodiment of the present invention.

A process of reproducing the key information KY thus recorded as auxiliary information will be described below. FIG. 14 shows in block form an optical disc reproducing apparatus 40B for reproducing the optical disc 41B which is produced as described above. Those parts of the optical disc reproducing apparatus 40B which are identical to those of the compact disc player 40A shown in FIG. 7 are denoted by identical reference characters, and will not be described in detail below.

In the optical disc reproducing apparatus 40B shown in FIG. 14, since the output signal from an ECC decoding circuit 48 is encrypted, a decrypting circuit 81 decrypts the encrypted output signal from the ECC decoding circuit 48 with key information KY which is detected from the recorded signal on the optical disc 41B by an encryption key detecting circuit 80.

An optical pickup 44 applies a laser beam to the optical disc 41B and detects a laser beam returning from the optical disc 41B with a photodetector. The optical pickup 44 outputs a reproduced signal RF whose signal level changes depending on the amount of light of the returning laser beam on the detecting surface of the photodetector. The signal level of the reproduced signal RF changes depending on pits recorded on the optical disc 41B.

The optical pickup 44 processes the laser beam returning from the optical disc 41B according to the push-pull method to generate a push-pull signal PP whose signal level varies depending on the position of a pit with respect to the laser beam spot on the optical disc 41B. The optical pickup 44 also generates and outputs a focus error signal whose signal level varies depending on the amount of a focus error.

A servo circuit 43 limits the band of the push-pull signal PP from the optical pickup 44 to generate a tracking error signal whose signal level varies depending on a detracked amount (off-track amount) of the laser beam spot with respect to the track center. The servo circuit 43 performs tracking control on the optical pickup 44 to adjust the position of the laser beam spot on the optical disc 41B based on the tracking error signal. The servo circuit 43 also performs focusing control on the optical pickup 43 to focus the laser beam spot on the optical disc 41B based on the focus error signal.

According to the second embodiment, the push-pull signal PP from the optical pickup 44 is supplied to a high-pass filter 82. The high-pass filter 82 removes the detracked amount of the laser beam spot with respect to the track center from the push-pull signal PP whose signal level varies depending on the position of a pit with respect to the laser beam spot on the optical disc 41B, and outputs a displacement detected signal HPP whose signal level varies depending on the position of a pit with respect to the track center.

The encryption key detecting circuit 80 is supplied with channel clock pulses CCK from a clock reproducing circuit 46, a binary signal BD from a binary converter 45, and the displacement detected signal HPP from the high-pass filter 82, and detects the key information KY from the displacement detected signal HPP.

Figure 15:
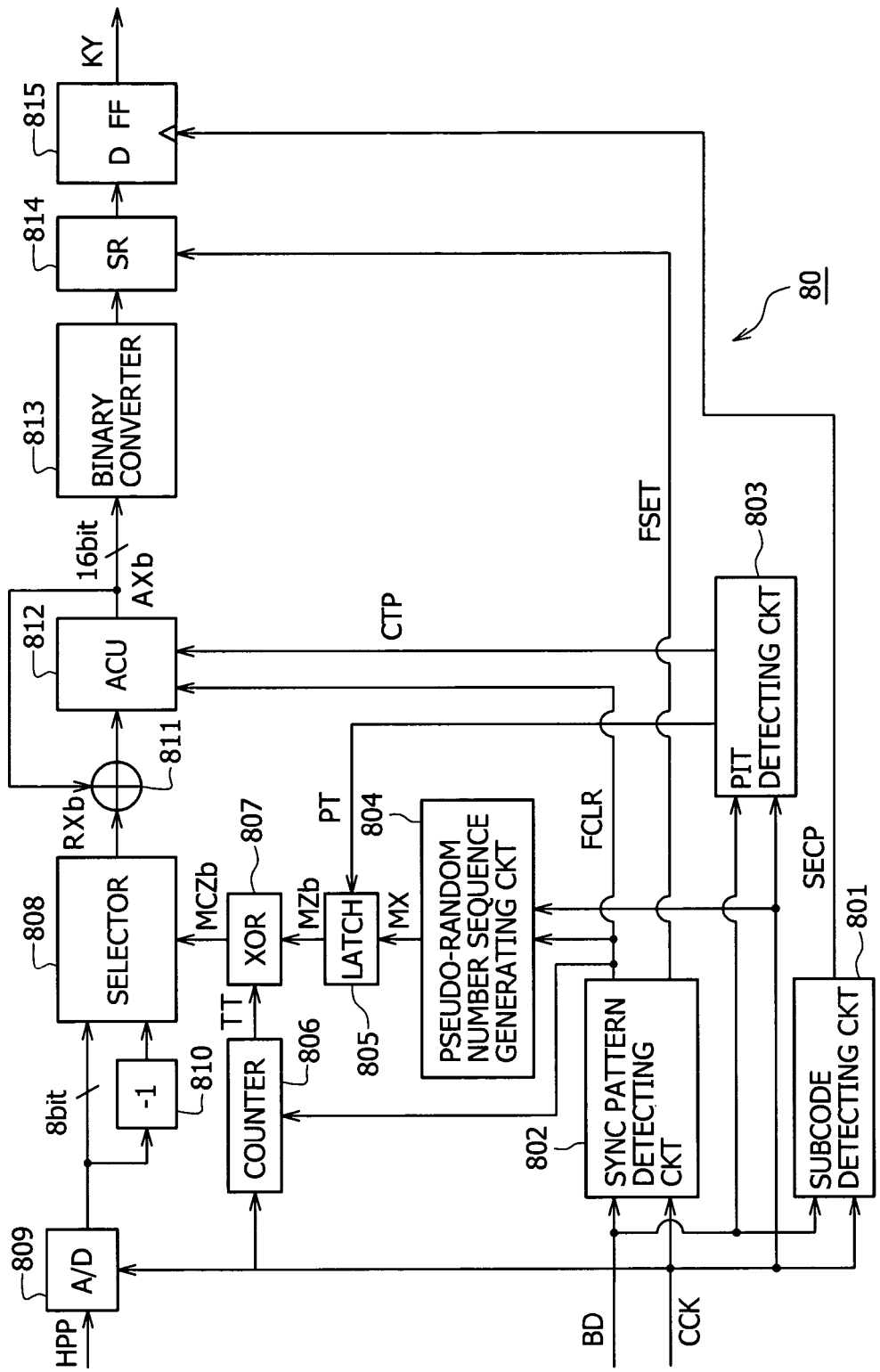
FIG. 15 is a block diagram of an encryption key detecting circuit in the optical disc reproducing apparatus shown in FIG. 14.

FIG. 15 shows in block form details of the encryption key detecting circuit 80.

As shown in FIG. 15, a subcode detecting circuit 801 monitors the binary signal BD (see FIGS. 9(A) and 9(B)) based on the channel clock pulses CCK (see FIG. 9(C)) from the clock reproducing circuit 46, and decodes subcode information from the binary signal BD. The subcode detecting circuit 801 monitors time information of the decoded subcode information, and outputs a one-second detected pulse SECP whose signal level goes high each time the time information changes one second.

A synchronous pattern detecting circuit 802 successively latches binary signals BD from the binary converter 45 based on the channel clock pulses CCK from the clock reproducing circuit 46, and determines the successive logic levels of the binary signals BD to detect a frame sync signal. Based on the detected frame sync signal, the synchronous pattern detecting circuit 802 outputs a set pulse FSET (see FIG. 9(E)) whose signal level is high during the period of one channel clock pulse CCK at the start of each frame, and a clear pulse FCLR (see FIG. 9(D)) whose signal level is high during the period of one channel clock pulse CCK, following the set pulse FSET.

The binary signal BD has its synchronous pattern repeated 98 times per second in the period of 588 channel clock pulses. Therefore, the synchronous pattern detecting circuit 802 outputs a clear pulse FCLR and a set pulse FSET in synchronism with the synchronous pattern.

A pit detecting circuit 803 successively latches binary signals BD based on the channel clock pulses CCK, and compares two successive latched data to detect the time of a leading pit edge from the binary signals BD. From the detected time, the pit detecting circuit 803 outputs an edge detected signal PT at the time of the leading pit edge. Similarly, the pit detecting circuit 803 detects the time of a trailing pit edge, and outputs a center detected signal CTP at substantially the center of each pit from the time of the leading pit edge and the time of the trailing pit edge.

A pseudo-random number sequence generating circuit 804, which has a ROM incorporated therein, initializes addresses with a clear pulse FCLR from the synchronous pattern detecting circuit 802. Then the circuit 804 steps through the addresses based on the channel clock pulses CCK to access the ROM, thereby generating M-sequence random number data MX corresponding to the M-sequence random number data MS generated by the optical disc recording apparatus 1B.

A latch circuit 805 latches the M-sequence random number data MX from the pseudo-random number sequence generating circuit 804 with the edge detected signal PT from the pit detecting circuit 803, and outputs the latched M-sequence random number data MZb. That is, the latch circuit 805 latches the M-sequence random number data MX in timed relation to the processing operation of the exclusive-OR circuit 25 in the key modulating circuit 63, i.e., at the time to start forming each pit, and outputs an M-sequence latch signal MZb which holds the latched M-sequence random number data MX until one pit is completed.

A counter 806 comprises a 4-bit counter for counting channel clock pulses CCK. The counter 806 is cleared by the clear pulse FCLR output from the synchronous pattern detecting circuit 802. The counter 806 supplies the most significant bit of the counter value as a toggle signal TT. The toggle signal TT corresponds to the toggle signal TGL generated in the optical disc recording apparatus 1B. The toggle signal TT is supplied to an exclusive-OR circuit 807.

The exclusive-OR circuit 807 exclusive-ORs the M-sequence latch signal MZb output from the latch circuit 805 and the toggle signal TT output from the counter 806 to generate an exclusive-ORed signal MCZb, and supplies the generated exclusive-ORed signal MCZb as a selection control signal to a selector 808.

The displacement detected signal HPP from the high-pass filter 82 is converted by an analog-to-digital converter 809 into an 8-bit digital signal based on the channel clock pulses CCK. The digital signal is directly supplied to the selector 808. The digital signal is also inverted in polarity by a polarity inverting circuit 810, and then supplied to the selector 808.

Depending on the logic level of the exclusive-ORed signal MCZb from the exclusive-OR circuit 807, the selector 808 selects and outputs either one of the digital signal directly supplied from the analog-to-digital converter 809 and the polarity-inverted digital reproduced signal from the polarity inverting circuit 810.

Specifically, when the exclusive-ORed signal MCZb is of logic level "1", the selector 808 selects and outputs the digital signal directly supplied from the analog-to-digital converter 809, and when the exclusive-ORed signal MCZb is of logic level "0", the selector 808 selects and outputs the polarity-inverted digital reproduced signal. Therefore, the selector 808 reproduces the logic level of the encryption key information KY (KD) which has been modulated by the M-sequence signal MS and the toggle signal TGL into multi-valued data, and outputs the multi-valued data as reproduced data RX to an adder 811.

The adder 811, which comprises a 16-bit digital adder, adds the reproduced data RXb and output data AXb of an accumulator 812, which accumulates output data from the adder 811, and outputs the sum data. The accumulator 812 comprises a 16-bit memory for holding output data from the adder 811, and feeds back the accumulated data to the adder 811. The adder 811 and the accumulator 812 jointly serve as an accumulative adder.

Specifically, after the accumulator 812 clears its accumulated data with a clear pulse FCLR from the synchronous pattern detecting circuit 802, the accumulator 812 accumulates output data from the adder 811 in synchronism with the signal CTP from the pit detecting circuit 803. The accumulator 812 outputs an accumulated value AXb to a binary converter 813.

The binary converter 813 converts the accumulated value AXb from the accumulator 812 into binary data based on a predetermined reference value, and outputs the binary data. Specifically, the binary converter 813 converts the multi-valued reproduced data RXb of the key information KY (KD) from the selector 808 into binary data, and outputs the binary data to a shift register 814.

The shift register 814, which comprises a 98-bit shift register, successively reads and outputs the binary data from the binary converter 813 at the time of the positive-going edge of the set pulse FSET. The shift register 814 transfers output data to a latching flip-flop 815.

The flip-flop 815 reads and holds the output data from the shift register 814 as parallel data in timed relation to the one-second detected pulse SECP. Therefore, the flip-flop 815 holds the data KD comprising the key information KY and the inherent-value data KZ. The encryption key detecting circuit 80 selectively outputs bits from the flip-flop 815 to supply the key information KY to the decrypting circuit 81 to decrypt the encrypted digital audio signal.

In the second embodiment, though the displacement detected signal HPP obtained from each pit represents a small displacement, even if the SN ratio is highly poor, displacement detected signals HPP are accumulated over one frame, as described above, and identified for binary levels at a high SN ratio to reproduce key information KY. The key information KY which has been made difficult to find can thus reliably be reproduced.

In the encryption key detecting circuit 80, when the accumulator 812 accumulates the signal levels of displacement detected signals HPP, the accumulator 812 reads and accumulates the sum from the adder 811 at the time corresponding to the center of each pit. Therefore, the encryption key detecting circuit 80 can accumulate the signal levels of displacement detected signals HPP at the time when the signal levels are sufficiently stable, thus further increasing the accuracy with which to detect the key information KY.

Modifications of the Second Embodiment

In the second embodiment described above, one bit of key information is assigned to one frame. However, a plurality of bits of key information may be assigned to one frame, or one bit of key information is assigned to a plurality of frames. Alternatively, rather than assigning a bit or bits of key information to a frame or frames of audio data recorded as a sequence of pits, one bit of key information may be assigned based on the number of pits.

In the second embodiment described above, one bit of key information is assigned to one frame, thereby distributing and recording one bit of key information over 50 or more pits. However, the number of pits to which one bit of key information is assigned may be set to various values as required.

In the second embodiment described above, bits of meaningless data are added to the key information and recorded therewith. However, an error correcting code may be added to the key information and recorded therewith. Copyright data may also be added to the key information and recorded therewith.

In the second embodiment described above, key information required to decrypt encrypted audio data is recorded as auxiliary information. However, various data required to decrypt encrypted audio data, such as data required to select and decode key information, for example, may be recorded as auxiliary information by changing the recorded position of pits.

The second embodiment is also applicable for recording the disc ID code according to the first embodiment as auxiliary information.

Other Embodiments

According to the present invention, the process of changing recorded traces of pits or marks is not limited to the first embodiment and the second embodiment that have been described above.

According to an alternative example, the time of a positive-going edge or a negative-going edge of the EFM signal S2 may be modulated by a signal produced by modulating auxiliary information with a sequence of pseudo-random number data and a toggle signal, for thereby controlling the length of a pit or a mark (the length thereof along the track scanning direction) such that the position of a leading or trailing edge of the bit or the mark will be displaced within 10% of the basic period T, thus changing the recorded trace (see Japanese Patent Laid-open No. Hei 11-126426).

In this example, the auxiliary information may be demodulated by a circuit similar to the disc ID code reproducing circuit of the optical disc reproducing apparatus 40 according to the first embodiment.

Alternatively, the reflectance of the information recording surface may locally be changed at a location that is spaced a predetermined distance from the edge of a pit or a mark, based on a signal produced by modulating auxiliary information with a sequence of pseudo-random number data and a toggle signal, for thereby changing the recorded trace of the pit or the mark to record the auxiliary information (see Japanese Patent Laid-open No. Hei 11-191218).

The reflective recording surface of an optical disc used in the above example is of the same film structure as the information recording surface of a CD-R (Compact Disc Recordable: write-once optical disc). This optical disc is constructed such that when a laser beam having an amount of light equal to or greater than a predetermined level is applied to the optical disc, the reflectance of the reflective recording surface at the position where the laser beam is applied is irreversibly changed, and the change in the reflectance can be detected as a change in the amount of returning light.

Auxiliary information is additionally recorded by a finishing apparatus on an optical disc on which main information is recorded as pits or marks. Specifically, based on a sequence of data based on the auxiliary information that is modulated by a signal produced by combining a sequence of pseudo-random number data and a given periodic signal, the reflectance of the information recording surface of the optical disc is locally changed at a location that is spaced a predetermined distance from the edge of a pit or a mark.

A reproduced signal RF from the optical disc on which the auxiliary information is additionally recorded has a signal level locally changed because of a change caused in the reflectance by the additional recording of the auxiliary information. The auxiliary information can be reproduced based on the change in the signal level of the reproduced signal RF.

Further alternatively, auxiliary information may be recorded on an optical disc by locally changing the reflectance of the optical disc at the time the laser beam crosses a pit or a mark, based on a signal produced by modulating auxiliary information with a sequence of pseudo-random number data and a toggle signal (see Japanese Patent Laid-open No. Hei 11-163750).

In the above embodiments, each of the counter 24 and the counter 60 comprises a 4-bit counter. However, counters of other bit lengths may be used insofar as logic level "1" and logic level "0" occur with equal probability in their output signals.

In the above embodiments, each of the counter 24 and the counter 60 or the counter 806 is of a simple arrangement for outputting logic level "1" and logic level "0" at identical intervals. However, a plurality of counters may be combined to produce a periodic signal representing a repetitive sequence of logic levels, e.g., logic level "1" during seven channel clock pulses, logic level "0" during next nine channel clock pulses, logic level "1" during next nine channel clock pulses, and logic level "0" during next seven channel clock pulses. If the number of logic levels "1" and the number of logic levels "0" in each of repetitive periods of a signal are equal to each other, then the signal can be used as a periodic toggle signal TGL or TT.

In the above embodiments, each of the counter 24 and the counter 60 or the counter 806 comprises registers one of which produces an output signal. However, a table storing the same numbers of logic levels "1" and logic levels "0" may be provided, and may be referred to by being addressed by count values from a counter to produce a periodic signal representing a sequence of logic levels read from the table.

In the first embodiment, a signal representing a combination of a sequence of pseudo-random numbers (M-sequence random numbers) and a periodic toggle signal (TGL, TT) is used to record and reproduce auxiliary information such as a disc ID signal SC1 or key information KY. However, a signal representing a combination of a sequence of pseudo-random numbers and a periodic toggle signal may be recorded in a table, and the table may be referred to instead of the random number generating circuits 23, 55, 804 and the counters 24, 60, 806.

In the above embodiments, the pit widths of pits in the lead-in area are modulated to record a sequence of data representing auxiliary information in addition to a sequence of data representing main information recorded as pits and lands. According to the present invention, furthermore, recorded traces of pits or marks may be changed to record a sequence of data representing auxiliary information in various areas such as a user area. For example, recorded traces of pits or marks may be changed to record a sequence of data representing auxiliary information in an area free of auxiliary information, making it difficult to find the area where the data representing auxiliary information is recorded.

In the above embodiments, main information such as a digital audio signal and auxiliary information such as a disc ID code are converted into binary signals and reproduced. The present invention is also applicable to any of various identifying processes such as the Viterbi decoding process.

In the above embodiments, a digital audio signal is EFM-modulated and recorded. However, the present invention is also applicable to a digital audio signal that is modulated by any of various modulation processes such as a 1-7 modulation process, a 8-16 modulation process, and a 2-7 modulation process.

In the above embodiments, desired data are recorded as pits and lands. However, the present invention is also applicable to the recording of desired data as marks and spaces.

In the above embodiments, the present invention is applied to a compact disc and peripheral devices thereof for recording audio signals. However, the present invention is also applicable to various optical discs such as a video disc, and peripheral devices thereof.

INDUSTRIAL APPLICABILITY

According to the present invention, since pseudo-random numbers are modulated by a predetermined periodic signal, even if several tens of pseudo-random numbers (in several tens of repeated periods) are observed, it is difficult to estimate the structure of the sequence of pseudo-random numbers. Therefore, anyone who attempts to produce an illegal copy finds it difficult to analyze and duplicate an optical disc which has auxiliary information recorded thereon.

The invention claimed is:

1. An optical disc recording apparatus for generating a modulation signal having a signal level switched at a period which is an integral multiple of a basic period in accordance with main information and controlling an optical beam applied to an optical disc based on said modulation signal to successively form, on said optical disc, pits and lands or marks and spaces having lengths which are represented by integral multiples of a basic length corresponding to said basic period, wherein a sequence of data based on auxiliary information is modulated by a signal represented by a combination of a sequence of pseudo-random numbers and a predetermined periodic signal, and recorded traces of said pits or said marks are changed depending on the modulated sequence of data, thereby recording said auxiliary information on said optical disc, the optical disc recording apparatus comprising:

a first modulation signal generating unit configured to generate a first modulation signal having a signal level switched at a period which is an integral multiple of said basic period in accordance with said main information;

a second modulation signal generating unit configured to modulate said first modulation signal with a signal based on the sequence of data based on said auxiliary information;

a recording beam modulating unit configured to modulate said optical beam with a signal output from said second modulation signal generating unit; and an optical system for applying said optical beam to said optical disc;

said second modulation signal generating unit comprising:

a pseudo-random number generating unit configured to generate a pseudo-random number;

a periodic signal generating unit configured to generate said predetermined periodic signal, said periodic signal generating unit including a counter configured to count channel clock pulses output from a phase lock loop circuit, the counter being cleared by a frame clock pulse output from a synchronous detecting circuit, the counter supplying the most significant bit of the counter value as a toggle signal to an exclusive-OR circuit;

an auxiliary information modulating unit configured to modulate the sequence of data based on said auxiliary information with a signal represented by a combination of the random number from said pseudo-random number generating unit and the predetermined periodic signal from said periodic signal generating unit; and a modulation signal processing unit configured to modulate said first modulation signal to slightly change the recorded traces of said pits or said marks, based on the modulated sequence of data from said auxiliary information modulating unit.

2. The optical disc recording apparatus according to claim 1, wherein said periodic signal comprises a signal inverted at a period which is at least twice said basic period.

3. The optical disc recording apparatus according to claim 1, wherein said periodic signal generating unit comprises a unit configured to combine a plurality of signals inverted at a period which is at least twice said basic period to generate said periodic signal.

4. The optical disc recording apparatus according to claim 1, wherein said pseudo-random number generating unit comprises a linear feedback shift register.

5. The optical disc recording apparatus according to claim 1, wherein said recorded traces of said pits or said marks are changed at a position corresponding to a period extending substantially equally over a time corresponding to the center of said pits or said marks.

6. The optical disc recording apparatus according to claim 1, wherein said sequence of data based on said auxiliary information comprises a sequence of identification data for identifying said optical disc.

7. The optical disc recording apparatus according to claim 1, wherein said recorded traces of said pits or said marks which have lengths equal to or greater than a predetermined length are changed by changing a width of said pits or said marks at a time which is spaced a predetermined interval from a time corresponding to an edge of said pits or said marks.

8. A method of recording information on an optical disc by successively forming, on said optical disc, pits and lands or marks and spaces having lengths which are represented by integral multiples of a predetermined basic length to record main information on said optical disc, comprising:

generating at least two pseudo-random numbers;

counting, with a counter, channel clock pulses output from a phase lock loop circuit, the counting being cleared by a frame clock pulse output from a synchronous detecting circuit, the counting step including supplying the most significant bit of the counter value as a toggle signal to an exclusive-OR circuit;

modulating a sequence of data based on auxiliary information with a signal represented by a combination of a sequence of said at least two pseudo-random numbers and a predetermined periodic signal; and changing recorded traces of said pits or said marks depending on the modulated sequence of data, thereby recording said auxiliary information on said optical disc.

9. The method according to claim 8, wherein said recorded traces of said pits or said marks which have lengths equal to or greater than a predetermined length are changed by changing a width of said pits or said marks at a time which is spaced a predetermined interval from a time corresponding to an edge of said pits or said marks.

10. The method according to claim 8, wherein said recorded traces of said pits or said marks are changed by displacing a position where said optical beam is applied to said optical disc in a radial direction of said optical disc, depending on the sequence of data based on said auxiliary information which is modulated by the signal represented by the combination of the sequence of pseudo-random numbers and the predetermined periodic signal.

11. The method according to claim 8, wherein said recorded traces of said pits or said marks are changed by changing a length of said pits or said marks, depending on the sequence of data based on said auxiliary information which is modulated by the signal represented by the combination of the sequence of pseudo-random numbers and the predetermined periodic signal.

* * * * *